United States Patent [19]
Tanaka et al.

[11] Patent Number: 5,764,685
[45] Date of Patent: Jun. 9, 1998

[54] METHOD OF SETTING SPREAD CODE SERIES AND COMMUNICATION APPARATUS USING SPREAD SPECTRUM COMMUNICATION METHOD

[75] Inventors: Kiyoshi Tanaka; Hong Zuo, both of Ichikawa, Japan

[73] Assignee: Uniden Corporation, Chiba, Japan

[21] Appl. No.: 425,501

[22] Filed: Apr. 20, 1995

[30] Foreign Application Priority Data

Apr. 26, 1994 [JP] Japan .................. 6-112284

[51] Int. Cl.$^6$ .................................. H04K 1/00
[52] U.S. Cl. ........................... 375/200; 455/410
[58] Field of Search ..................... 375/200, 257, 375/259, 208, 205, 206, 209, 210, 343; 379/61, 62; 455/426, 410

[56] References Cited

U.S. PATENT DOCUMENTS

| | | | |
|---|---|---|---|
| 4,560,832 | 12/1985 | Bond et al. | 379/61 |
| 4,593,155 | 6/1986 | Hawkins | 455/88 |
| 4,639,549 | 1/1987 | Hirayama et al. | 379/62 |
| 4,736,404 | 4/1988 | Anglikowski et al. | 379/62 |
| 4,979,205 | 12/1990 | Hiraguchi et al. | 379/62 |
| 5,218,619 | 6/1993 | Dent | 375/205 |
| 5,319,634 | 6/1994 | Bartholomew et al. | 379/61 |
| 5,323,447 | 6/1994 | Gillis et al. | 379/61 |
| 5,353,341 | 10/1994 | Gillis et al. | 379/61 |
| 5,434,905 | 7/1995 | Maeda et al. | 379/61 |
| 5,463,659 | 10/1995 | Nealon et al. | 375/202 |
| 5,506,861 | 4/1996 | Bottomley | 375/200 |
| 5,511,090 | 4/1996 | Denton et al. | 375/205 |

FOREIGN PATENT DOCUMENTS

| | | |
|---|---|---|
| 2-5637 | 1/1990 | Japan . |
| 2-78329 | 3/1990 | Japan . |
| 2-241126 | 9/1990 | Japan . |
| 4-345218 | 12/1992 | Japan . |
| 5-110504 | 4/1993 | Japan . |

*Primary Examiner*—Tesfaldet Bocure
*Attorney, Agent, or Firm*—Fish & Richardson P.C.

[57] ABSTRACT

A spread code series setting apparatus which sets a spread code series used in a radio or radio communication system capable of performing communication according to spread spectrum method, and has a stationary communication unit such as the master unit of a cordless telephone, capable of setting a spread code series each time a predetermined condition is met and outputting resultant spread code series setting information, in addition to which said apparatus also has a movable unit such as a subordinate unit of a cordless telephone, capable of setting a spread code series based on the spread code series setting information transmitted from the stationary communication unit in which spread code series is set in accordance with a method which has a transmitting step in which a spread code series is set in a stationary communication unit each time a predetermined condition is met and the spread code series setting information concerning the set spread code series is transmitted, and a receiving step in which spread code series, derived from the spread code series setting information, is set in the movable unit.

24 Claims, 15 Drawing Sheets

METHOD OF SETTING SPREAD CODE SERIES AND COMMUNICATION APPARATUS USING SPREAD SPECTRUM COMMUNICATION METHOD

BACKGROUND OF THE INVENTION

1. Field of the Invention

The present invention is generally related to a spread spectrum communication system and, particularly, to a method and apparatus thereof for arbitrarily setting a spread code series to enable communication. More particularly, the present invention pertains to a spread code series setting method and apparatus which enables arbitrary setting of the spread code series when communications are conducted over a plurality of transceivers so as to improve the performance of a privacy function.

Still more particularly, the present invention is concerned with a communication apparatus having a base set (stationary communication unit) and a handset (movable unit), e.g., a cordless telephone system capable of communicating with each other by a spread spectrum communication method, and also with a method for arbitrarily setting the spread spectrum code series which is necessary for communication between the base set and the handset.

2. Description of Related Art

This kind of spread spectrum communication method, which has been conventionally used, is a method of transmitting information signals by converting the spectral bandwidth characteristic of the information signals into a remarkably wide spectral bandwidth. This method is known to have improved coherence and to have enhanced the confidentiality of signals. According to this spread spectrum communication method, for example, primary modulation of information signals is performed at a transmitting side by frequency modulation (FM), phase modulation (PM) or the like. This modulated wave goes through spread modulation by using spread codes and then is transmitted to a receiving side. Then, the receiving side receives the transmitted signals. On the receiving side, the same spread codes are generated at the same time as it receives the transmitted signals. Reverse spread is performed by utilizing the generated spread codes, and then primary demodulation is performed, thereby obtaining the original information signals.

Various suggestions have been made in order to put this spread spectrum communication method to practical use in the field of movable communication such as in car telephones and portable telephones. There are also some examples of adaptation of the spread spectrum communication method to the field of cordless telephones.

In the above field of movable communication, some prior art for setting spread code data has been disclosed (for example, refer to the official gazette of Japanese Patent Laid-Open (Kokai) Publication No. HEI 4-345218). This conventional method for setting spread code data is called "Code Division Multiple Access (CDMA)." According to CDMA, when one base station communicates with plural mobile stations, different spread codes are assigned to each line which is being used for communication. As the same base station assigns different spread codes, the base station assigns spread code data corresponding to the open channels, which are not communicating with mobile stations at that time, to each mobile station through a control channel. Accordingly, the assignment of spread code data is conducted mainly when the mobile stations transmit or receive signals.

Similarly, concerning a selective calling system in the field of movable communication, a method for effectively storing and setting identification (ID) codes, which are, however, different from spread code data, has been suggested (cf. official gazette of Japanese Patent Laid-Open (Kokai) Publication No. HEI 2-79329). According to this method, when specific codes are transmitted through radio lines from a specific transmitting device or base station, a handset detects the specific codes and stores ID codes, which are continuously transmitted, in a special storage means. Otherwise, ID codes are written from a writing device when the writing device is electrically and physically connected to a connecting terminal for writing.

On the other hand, an ID code characteristic of each cordless telephone is assigned to the cordless telephone so that the cordless telephone will not be connected to other cordless telephones. For this type of cordless telephone, a telephone which has a base set capable of setting ID codes to its handsets through a charge contact has been suggested (cf. U.S. Pat. No. 4,736,404).

Further, cordless telephones adapting the spread spectrum communication method with the enhanced conversation confidentiality over the phone has been suggested. This type of cordless telephone which is an adaption of the spread spectrum communication method is capable of establishing communication by using spread code data according to the spread spectrum communication method, once optional and common spread code data are set for both a base set and its handset.

SUMMARY OF THE INVENTION

An object of the present invention is to provide a method for a spread code system for arbitrary setting of a spread code series which is to be used in spread spectrum communication between a plurality of transceivers, as well as a communication apparatus which performs communication using the above-mentioned setting method.

To these ends, according to one aspect of the present invention, there is provided a spread code series setting apparatus for setting a spread code series used in a radio communication system capable of performing communication according to spread spectrum method, the spread code series setting apparatus comprises a stationary communication unit (a stationary communication controller), capable of setting the spread code series each time a predetermined condition is met and the apparatus outputs resultant spread code series setting information. The apparatus further comprises a movable unit (a movable terminal, a movable terminal means), capable of setting spread code series based on the spread code series setting information.

The stationary communication unit includes means for setting and storing spread code series each time the predetermined condition is met and for outputting spread code series data as the spread code series setting information, while the movable unit includes a means for receiving the spread code series data, producing a spread code series from the received spread code series data and storing the thus-obtained spread code series.

The stationary communication unit comprises a spread code series memory for storing the set spread code series and a spread code series outputting circuit for outputting a spread code series data as said setting information to said movable unit. Also, the movable unit includes a spread code series receiving circuit for receiving said spread code series data, a spread code series producing element, means for producing a spread code series from the received spread code series data and spread code series memory for storing the thus-obtained spread code series.

Preferably, the stationary communication unit stores a definite number of spread code series in its memory, a storage means, and has means such as a circuit which selects and stores, using a random number, a predetermined address from among the addresses in the memory each time the predetermined condition is met, the element such as a circuit, sets a spread code series in the memory based on the predetermined address and outputs the predetermined address as the spread code series setting information, and the movable unit stores spread code series which are the same as the definite number of spread code series, and has element such as a circuit which stores the predetermined address obtained from the spread code series setting information and selects and sets a spread code series from among the stored spread code series based on the stored predetermined address.

According to another aspect of the present invention, there is provided a spread code series setting method for setting spread code series to be used in a radio communication system capable of performing communication according to spread spectrum method. The setting method comprises a transmitting step in which a spread code series is set in a stationary communication controller each time a predetermined condition is met, and spread code series setting information concerning the set spread code series is transmitted and a receiving step in which spread code series, derived from the spread code series setting information, is set in a movable unit.

Thus, according to the present invention, the spread code series necessary for communication between a stationary communication unit and a movable unit in spectral communication is generated each time a predetermined condition is met. The spread code series thus obtained is stored and spread code series setting information concerning the stored spread code series is delivered to the movable unit. The movable terminal obtains the spread code series based on the spread code series setting information delivered thereto, and stores and sets the thus-obtained spread code series.

In a preferred form of the present invention, a definite number of spread code series are provided for use in communication between the stationary communication unit and the movable unit. These series are stored in the memory so as to be used both by the stationary communication unit and the movable unit. Each time a predetermined condition is met, the stationary communication unit selects a predetermined address out of the addresses stored in memory and supplies the spread code series setting information to the movable unit. The movable terminal obtains a predetermined address from the spread code series setting information, so that the stationary unit and the movable unit can select and use the same address, i.e., the same spread code series.

The predetermined condition is met, for example, when communication is commenced or ceased between a master unit and a subordinate unit or when the subordinate unit is placed at a predetermined location. At the predetermined location, the subordinate unit is placed on a carrier so that the master unit and the subordinate unit are connected to each other through a charging terminal, whereby the predetermined condition is met.

According to one form of the spread code series setting method of the present invention, a spread code series is generated upon each detection of completion of the connection between the stationary communication unit and the movable unit, and this spread code series is set by being stored in a memory means. The thus-generated spread code series is then outputted to a cable circuit as spread code series setting information. Upon receipt of the spread code series setting information via the cable circuit, the movable unit reforms the information into spread code series and sets this spread code series in the memory so as to use it when it communicates with the stationary communication unit.

According to another form of the method of the present invention, a spread code series is generated each time a predetermined condition is met, and is stored in memory. The thus generated spread code series is spread with basic spread code series so as to form spread code series setting information. This information is delivered to a radio circuit. Upon receipt of the spread code series setting information via the radio circuit, the movable unit effects inverse spreading of the information by using the same spread code series as the basic spread code series used in the stationary communication unit, so that the spread code series transmitted from the stationary communication unit is obtained. The thus-obtained spread code series is set in the memory of the subordinate unit. Communication between the master unit and the subordinate unit is conducted in accordance with spread spectrum communication using the spread code series which are thereby newly stored in both the master unit and subordinate units' memories.

DESCRIPTION OF THE PREFERRED EMBODIMENT

A preferred embodiment of the present invention will now be described with reference to the accompanying drawings.

Figure 1:
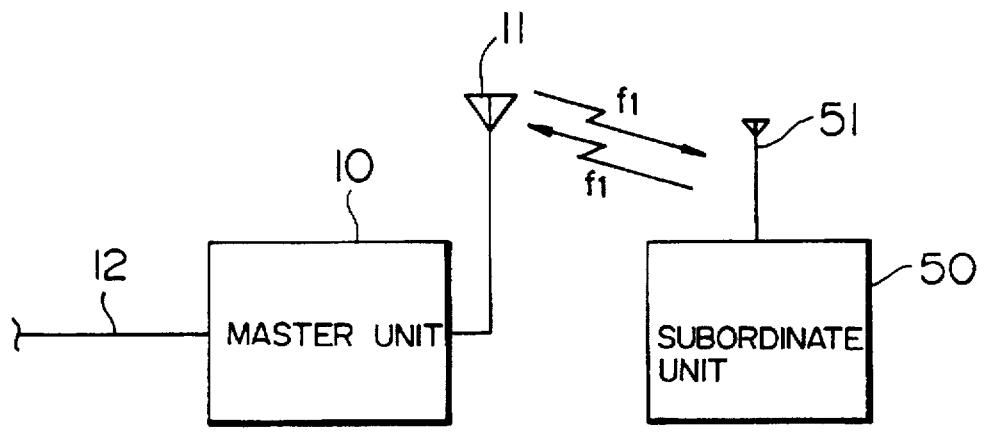
FIG. 1 is a block diagram of a communication apparatus which adopts a method of the present invention for setting spread code series.

FIG. 1 is a block diagram of a cordless telephone as an example of a communication system embodying the spread code series setting method of the present invention.

Referring to this Figure, the cordless telephone has a master unit 10 as a stationary communication control element and a subordinate unit 50 as a movable terminal. The master unit 10 serving as the stationary communication control element has an antenna 11, while subordinate unit 50 which serves as the movable terminal has an antenna 51. Master unit 10 and subordinate unit 50 are capable of performing mutual communication in accordance with spread spectrum communication method. To this end, both units 10 and 50 are adapted to be coupled to each other through their antennas 11 and 51 at a common frequency $f_1$. Master unit 10 as the stationary communication control element is adapted to be connected to a telephone circuit 12.

Figure 2:
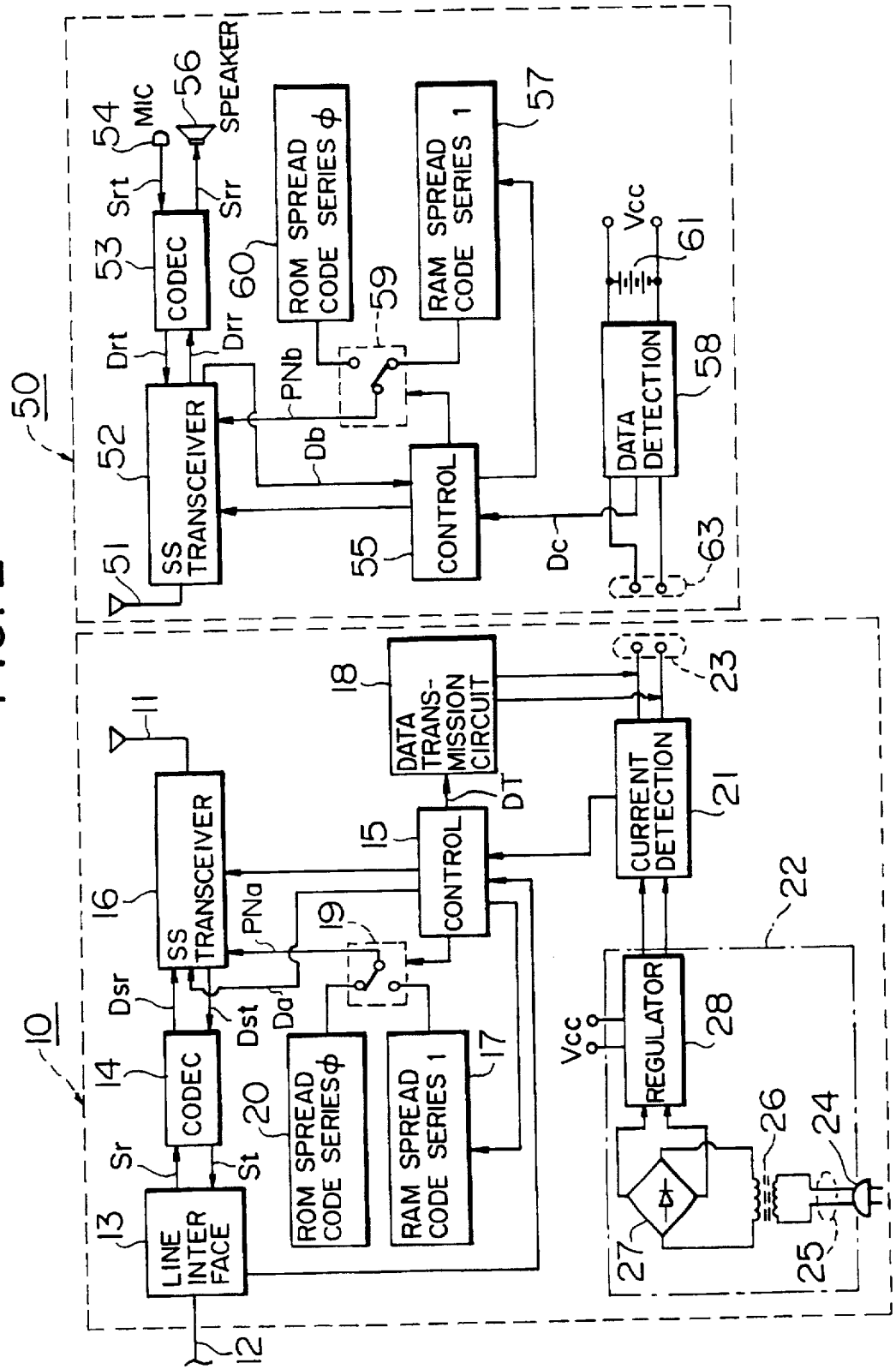
FIG. 2 is a block diagram showing the detail of the embodiment shown in FIG. 1.

FIG. 2 is a detailed block diagram showing the construction of the above cordless telephone.

Referring to FIG. 2, master unit 10 comprises: antenna 11, line interface circuit 13, CODEC 14, control unit 15, SS transceiver 16, RAM 17, data transmission circuit 18, switching element 19, ROM 20, current detection circuit 21, and power source circuit 22. Line interface circuit 13, which can be connected to telephone line 12, is connected thereto at the time of communication. Line interface circuit 13 is connected to CODEC 14. At the time of communication, line interface circuit 13 converts a sound signal from telephone line 12 into a receiving speech sound signal Sr and supplies it to CODEC 14. Further, it sends a transmitting speech sound signal St from CODEC 14 to telephone line 12.

CODEC 14 is connected to the sound signal input and output terminals of a spread spectrum transceiver (hereinafter referred to as "SS transceiver") 16. CODEC 14 converts the receiving speech sound signal Sr into a digital sound signal Dsr and supplies it to SS transceiver 16. Further, it converts a digital sound signal Dst from SS transceiver 16 into an analog transmitting speech sound signal St. SS transceiver 16 has a high-frequency terminal connected to antenna 11, and spread-modulates the digital sound signal Dsr from CODEC 14 by means of a spread code series PNa before transmitting it to subordinate unit 50 from antenna 11. At the same time, SS transceiver 16 receives a spread signal from subordinate unit 50 through antenna 11, and converts it into a digital sound signal Dst through inverse spreading, supplying it to CODEC 14. SS transceiver 16 operates under the control of control unit 15.

Control unit 15 formulates spread code series PNa, and performs overall control on the operation of the apparatus. Control unit 15 is connected to SS transceiver 16, RAM 17, data transmission circuit 18, switching element 19 and current detection circuit 21. A spread code series [1] formulated by control unit 15 can be stored in RAM 17. Switching element 19, which serves as an element for connecting RAM 17 or ROM 20 to SS transceiver 16, can be switched under the control of control unit 15. By this switching of switching element 19, either a spread code series [φ] stored in ROM 20 or a spread code series [1] stored in RAM 17 can be provided as the spread code series PNa.

Power source circuit 22 is connected to charge terminals 23 through current detection circuit 21. When subordinate unit 50 is placed in a subordinate-unit rest of master unit 10, charge terminals 63 of subordinate unit 50 are connected to charge terminals 23, thereby enabling subordinate unit 50 to be charged. Current detection circuit 21 can detect the charging current and notify control unit 15 of it. Upon receiving the notification from current detection circuit 21, control unit 15 extracts the spread code series [1] in RAM 17 and supplies it to data transmission circuit 18. Data transmission circuit 18 can transmit the pertinent data DT to subordinate unit 50 through charge terminals 23.

Control unit 15 is also capable of formulating a spread code series and storing it in the spread code series [1] in RAM 17 and, at the same time, supplying the spread code series to SS transceiver 16 as data Da. In this case, SS transceiver 16 can spread-modulate the spread code series data by means of the spread code series [φ] from ROM 20 and transmit it to subordinate unit 50 through a radio circuit.

Power source circuit 22 comprises: a plug 24 to be plugged into an outlet of a commercial power source; a power transformer 26 whose primary side is connected to plug 24 through a power cord 25; a rectifier bridge 27 having AC terminals connected to the secondary side of power transformer 26; and a regulator 28 connected to DC terminals of the rectifier bridge 27. The regulator 28 can smooth the rectified current into a steady DC voltage Vcc, which is supplied to each component device.

Subordinate unit 50 includes an SS transceiver 52, antenna 51, CODEC 53, microphone 54, control unit 55, speaker 56, RAM 57, data detection circuit 58, switching element 59, ROM 60 and battery 61. SS transceiver 52 has a high-frequency terminal connected to antenna 51, and sound signal input/output terminals connected to CODEC 53. SS transceiver 52 converts a high-frequency signal received by antenna 51 into a digital sound signal Drr through inverse spreading by element of a spread code series PNb (PNb=PNa), and supplies it to CODEC 53. At the same time, SS transceiver 52 can spread-modulate a digital sound signal Dsr from CODEC 53 by means of spread code series PNa, and transmit it to master unit 10 from antenna 51.

CODEC 53 is connected to microphone 54 and speaker 56, and receives a sending speech sound signal Srt obtained by microphone 54. Further, CODEC 53 can supply a receiving speech sound signal Srr to speaker 56. CODEC 53 converts the transmitting speech sound signal Srt, obtained by microphone 54, into a digital sound signal Drt, and supplies it to SS transceiver 52, and, further, converts a digital sound signal Drr from SS transceiver 52 into an analog receiving speech sound signal Srr, supplying it to speaker 56.

SS transceiver 52 operates under the control of control unit 55, which is connected to SS transceiver 52, RAM 57, data detection circuit 58 and switching element 59. Switching element 59, which serves as an element for connecting RAM 57 or ROM 60 to SS transceiver 52, can be switched under the control of control unit 55. By the switching of switching element 59, either a spread code series [φ] stored in ROM 60 or a spread code series stored in RAM 57 can be provided as the spread code series PNb. Another sound signal output terminal of SS transceiver 52 is connected to control unit 55, so that data Db from SS transceiver 52 can be supplied to control unit 55. Control unit 55 is capable of writing any requisite spread code series to RAM 57. Further, control unit 55 can receive data Dc from data detection circuit 58.

The ends of battery 61 of subordinate unit 50 are connected to charge terminals 63 and data detection circuit 58. A voltage Vcc can be supplied from the ends of battery 61 to each component device of subordinate unit 50.

Figure 3:
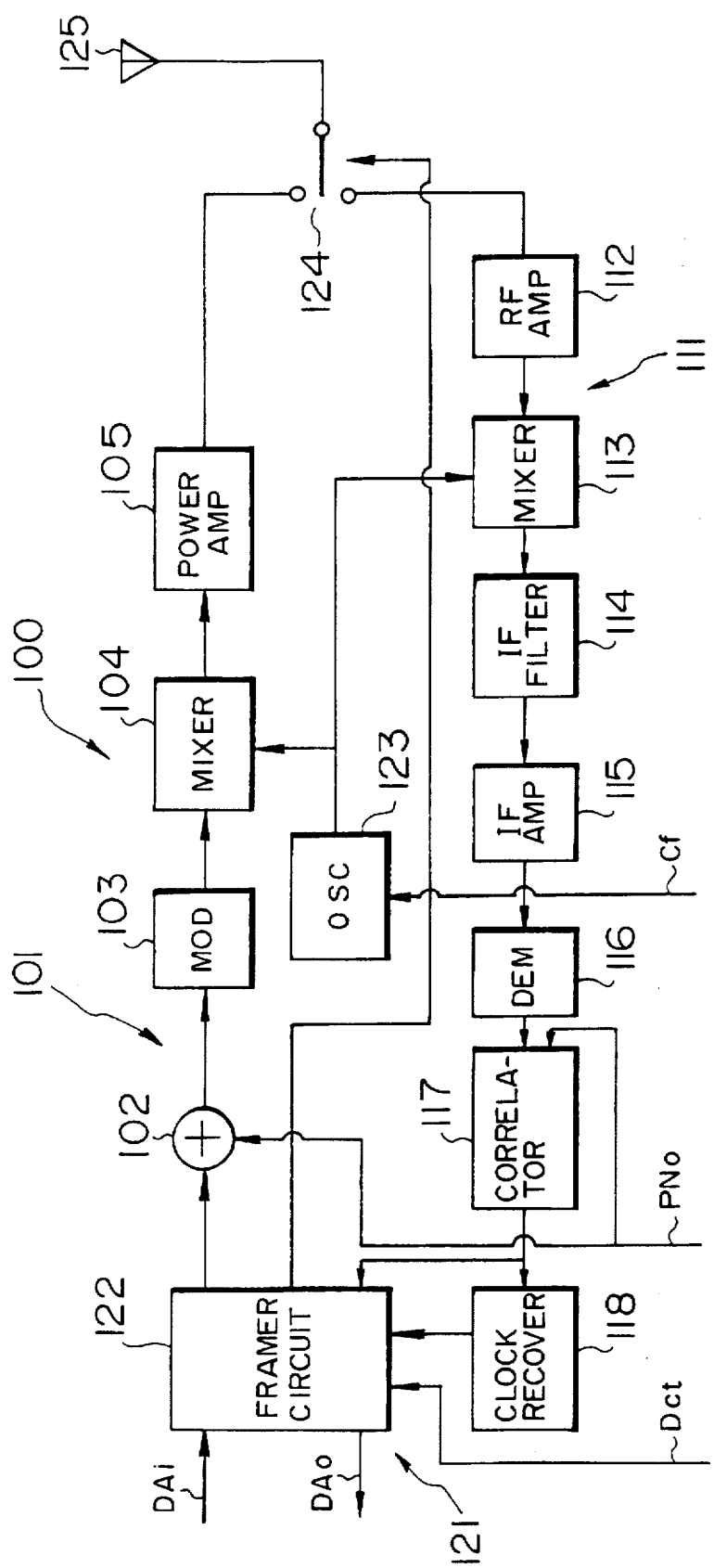
FIG. 3 is a block diagram illustrating the construction of an SS transceiver used in the embodiment.

FIG. 3 is a block diagram showing, in detail, an example of the configuration of SS transceiver 16 of master unit 10 or of SS transceiver 52 of subordinate unit 50. Hereinafter, an SS transceiver 100, which can serve both as SS transceiver 16 and as SS transceiver 52, will be described.

SS transceiver 100 is roughly composed of a transmission system 101, a reception system 111 and a common system 121. Transmission system 101 comprises an EXCLUSIVE-OR circuit 102, a modulator 103, a mixer circuit 104 and a power amplifier 105. Reception system 111 comprises a radio-frequency amplifier 112, a mixer circuit 113, an intermediate-frequency filter 114, an intermediate-frequency amplifier 115, a demodulator 116, a correlation circuit 117 and a clock recover circuit 118. Common system 121 comprises a framer circuit 122, a local oscillator 123, a switch 124 and an antenna 125.

Transmission system 101, reception system 111 and mixer circuit 113 are constructed as follows: digital sound data DAi to be transmitted is input to framer circuit 122, which performs time division multiplexing on the digital sound data DAi to convert it to short, burst-like signals. One output terminal of framer circuit 122 is connected to EXCLUSIVE-OR circuit 102, thereby enabling the burst-like signals from framer circuit 122 to be input to EXCLUSIVE-OR circuit 102.

EXCLUSIVE-OR circuit 102, which is supplied with a spread code series PNx (x is a for master unit 10, and b for subordinate unit 50), is a circuit for EXCLUSIVE-ORing the burst-like signals with the spread code series PNx. Output terminal of EXCLUSIVE-OR circuit 102 is connected to modulator 103, so that the output signal from EXCLUSIVE-OR circuit 102 can be supplied to modulator 103.

Modulator 103 is a circuit for modulating the input signal in a predetermined manner. The output terminal of modulator 103 is connected to mixer circuit 104, thereby enabling the output of modulator 103 to be input to mixer circuit 104, which is supplied with a local oscillation frequency from local oscillator 123. Mixer circuit 104 is a circuit for changing the frequency of the signal from modulator 103 to a predetermined frequency with the local oscillation frequency from the local oscillator. The output terminal of mixer circuit 104 is connected to the input terminal of power amplifier 105, so that the output signal from mixer circuit 104 can be supplied to power amplifier 105.

Power amplifier 105 can amplify the input signal before supplying it to switch 124. Switch 124 serves to connect antenna 125 to the output terminal of power amplifier 105 or the input terminal of radio-frequency amplifier 112. During communication, switch 124 causes antenna 125 to be alternately connected to the output terminal of power amplifier 105 and to the input terminal of radio-frequency amplifier 112 in a fixed cycle by a control signal from framer circuit 122. Thus, the radio-frequency output from power amplifier 105 is output from antenna 125 at fixed intervals.

When SS transceiver 100 is used in master unit 10 and subordinate unit 50, switch 124 in master unit 10 and that in subordinate unit 50 are periodically switched in the following manner: when switch 124 in master unit 10 is connected to power amplifier 105, switch 124 in subordinate unit 50 is connected to radio-frequency amplifier 112; and when switch 124 in master unit 10 is connected to radio-frequency amplifier 112, switch 124 in subordinate unit 50 is connected to power amplifier 105.

When antenna 125 is connected to radio-frequency amplifier 112 through switch 124, a radio-frequency signal induced in antenna 125 is supplied to radio-frequency amplifier 112 through switch 124. In radio-frequency amplifier 112, this radio-frequency signal undergoes radio-frequency amplification before it is supplied to mixer circuit 113. Mixer circuit 113 is supplied with a local oscillation frequency from local oscillator 123.

Mixer circuit 113 mixes the radio-frequency signal with the local oscillation frequency to form an intermediate-frequency signal. Mixer circuit 113 is connected to demodulator 116 through intermediate-frequency filter 114, so that the intermediate-frequency signal component of the mixed signal undergoes filtering before the signal is supplied to intermediate-frequency amplifier 115. Intermediate-frequency amplifier 115 can supply the intermediate-frequency signal to demodulator 116 after effecting intermediate-frequency amplification on the signal. Demodulator 116 effects a predetermined demodulation on the signal before supplying it to correlation circuit 117. Correlation circuit 117 detects its correlation with a spread code series PNo and supplies it to clock recover circuit 118 and framer circuit 122.

Clock recover circuit 118 detects a clock and supplies it to framer circuit 122, which outputs digital sound data DAo on the basis of the signal from correlation circuit 117. In master unit 10, framer circuit 122 and local oscillator 123 are connected to control unit 15, and, in subordinate unit 50, they are connected to control unit 55. Framer circuit 122 is capable of passing control data Dct between them, and local oscillator 123 is supplied with a frequency control signal Cf.

Figure 4:
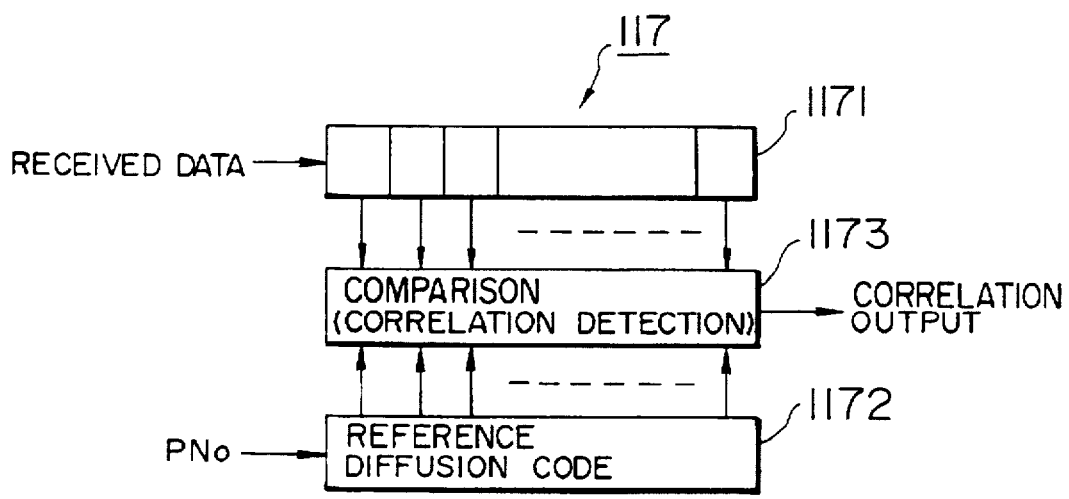
FIG. 4 is a block diagram showing the construction of a correlation detecting circuit of an SS transceiver used in the embodiment.

FIG. 4 is a block diagram showing an example of the construction of correlation circuit 117 in SS transceiver 100.

Correlation circuit 117 comprises: a serial parallel register 1171 which can output any input demodulated reception data from demodulator 116 as a parallel signal; a serial parallel register 1172 which can output any input spread code series PNo for reference as a parallel signal; and a comparator 1173 which performs comparison (correlation detection) on the parallel data from registers 1171 and 1172 to output a correlation value.

Figure 5:
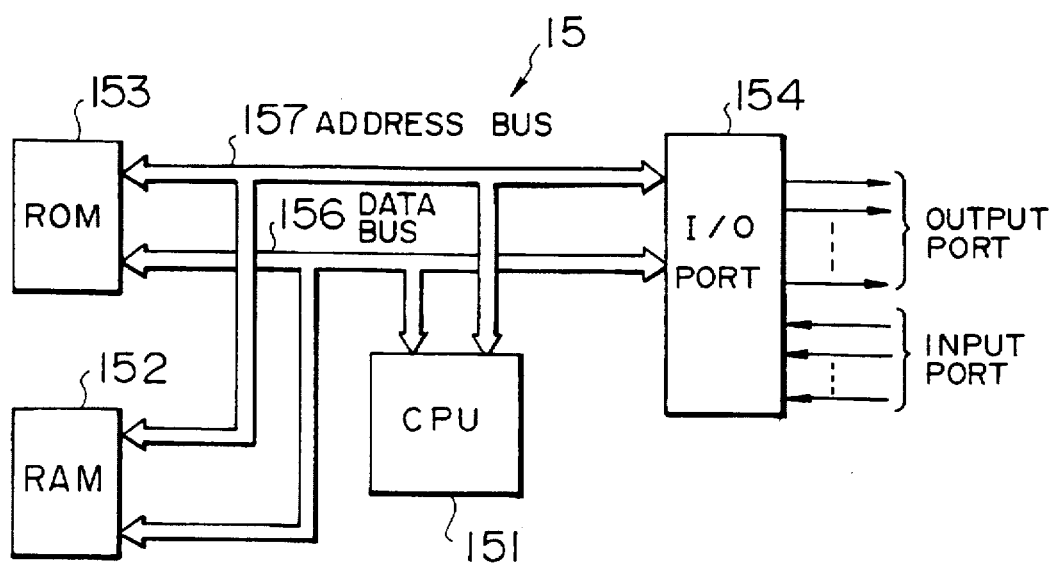
FIG. 5 is a block diagram showing the construction of a control unit used in the embodiment.

FIG. 5 is a block diagram showing an example of the construction of control unit 15 of the master unit or of control unit 55 of subordinate unit 50. A control unit 150 will be described which can be used for both of the two units.

Control unit 150 may consist, for example, of a device referred to as a one-chip CPU. It comprises a CPU (central processing unit) 151, a RAM (random access memory) 152, a ROM (read only memory) 153, an input/output device (I/O port) 154, and an address bus 157 and a data bus 156 which connects these components. CPU 151 operates in accordance with a program stored in ROM 153, and, when any requisite data or the like is input, executes corresponding processing to cause the entire apparatus to perform a desired operation.

CPU 151 can formulate a spread code series PN. I/O port 154 is connected to the external circuit including SS transceiver 16, RAM 17, data transmission circuit 18, switching element 19, etc. in the case of master unit 10, and, in the case of subordinate unit 50, I/O port 154 is connected to the external circuit including SS transceiver 52, RAM 57, switching element 59, etc., so that it can output the requisite control signals, etc. or receive predetermined signals.

Figure 6:
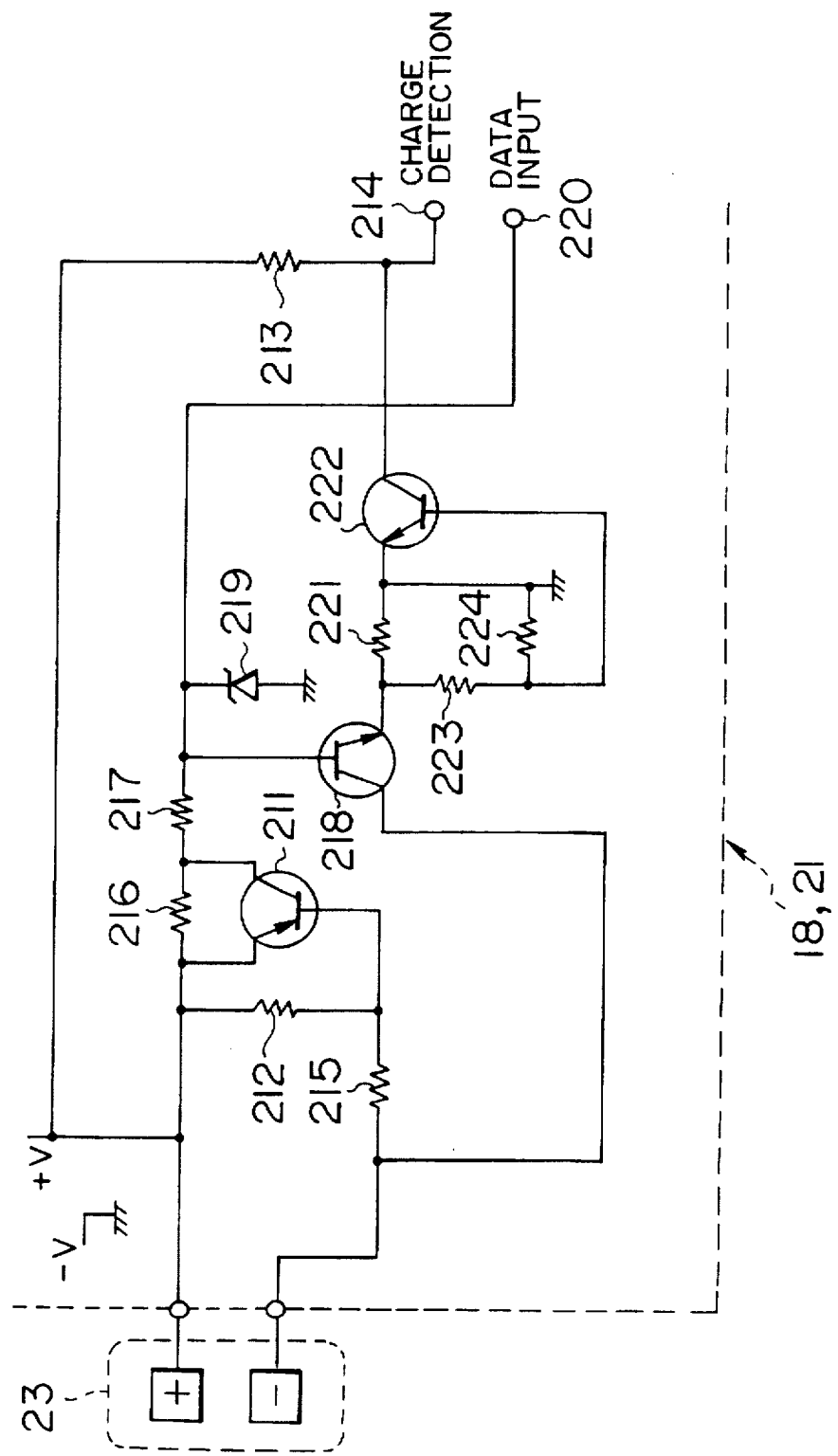
FIG. 6 is a circuit diagram showing the construction of a current detecting circuit and a data transmission circuit in the embodiment.

FIG. 6 is a circuit diagram specifically showing the circuit configuration of current detection circuit 21 and data transmission circuit 18 in master unit 10.

In FIG. 6, the positive output terminal (+V) of regulator 28 is connected to the positive pole of charge terminals 23, and the negative output terminal (-V) of regulator 28 is grounded. The output terminal (+V) is connected to the emitter of a transistor 211 of the 2SC2721G standard, and, at the same time, to the base of transistor 211 through a resistor 212 of 4.7 kΩ. Similarly, the positive terminal (+V) is connected to a charge detection terminal 214 through a resistor 213. The base of transistor 211 is also connected to the negative pole of charge terminals 23 through a resistor 215 of 18 kΩ.

A resistor 216 of 100 kΩ is connected between the emitter and collector of transistor 211. The collector of transistor 211 is connected to the base of a transistor 218, the cathode of a Zener diode 219 of the HZ483 standard and a data input terminal 220 through a resistor 217 of 580 Ω. The anode of the Zener diode 219 is grounded. The collector of transistor 218 is connected to one pole of charge terminals 23.

The emitter of transistor 218 is connected to the emitter of a transistor 222 and the earth electrode through a resistor of 27 Ω and ¼ W. Further, the emitter of transistor 218 is connected to the base of transistor 222 through a resistor 223 of 220 Ω. The base of transistor 222, in turn, is connected to the earth electrode through a resistor 224 of 33 kΩ. The collector of transistor 222 is connected to the emitter of transistor 222 of the 2SC2712G standard in current detection circuit 21. Data DT from control unit 15 is applied to data input terminal 220. Further, charge detection terminal 214 is connected to I/O port 154 of control unit 15, so that a charge detection signal can be supplied to control unit 15.

Figure 7:
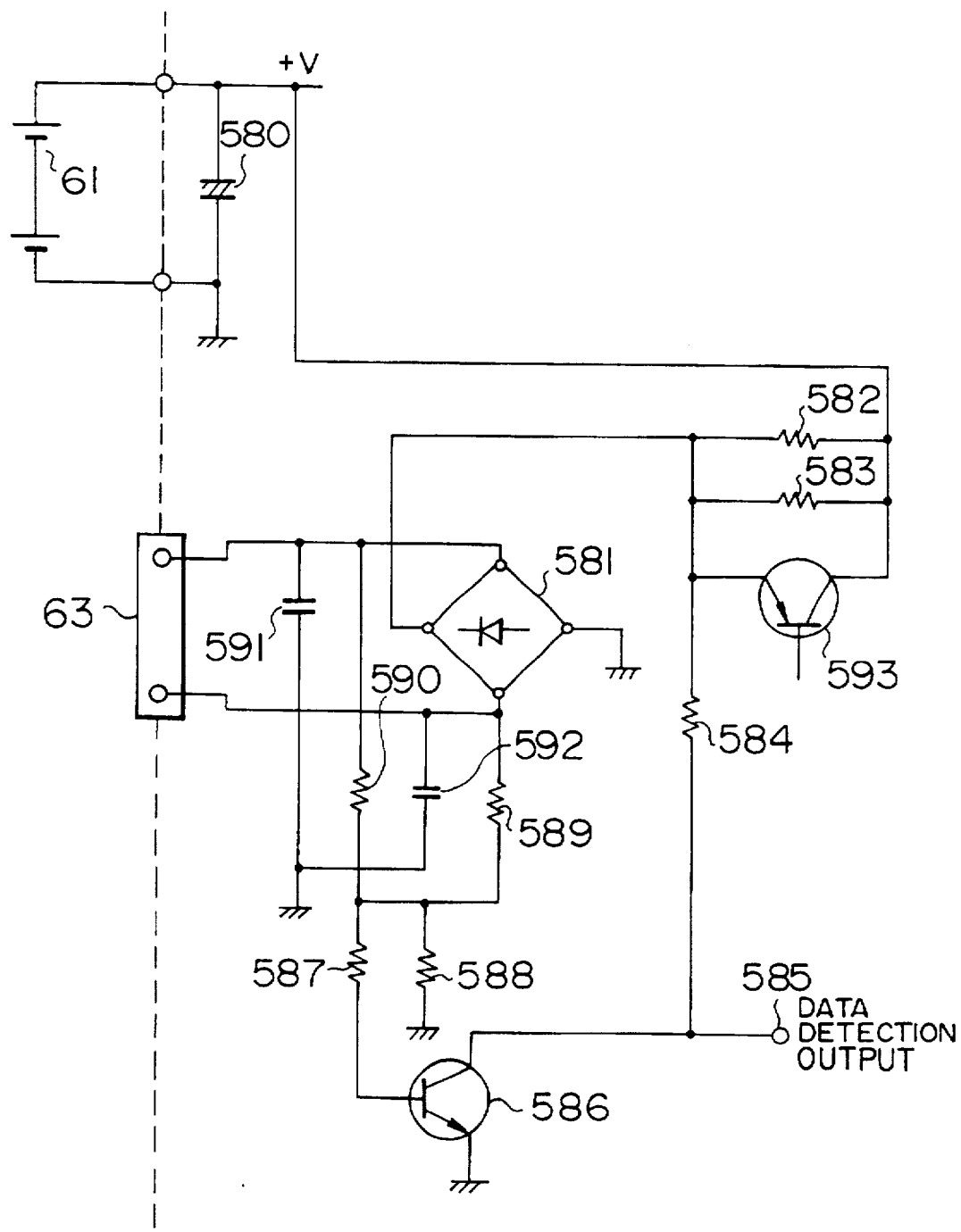
FIG. 7 is a circuit diagram showing the construction of a data detecting circuit used in the embodiment.

FIG. 7 is a circuit diagram showing the data detection circuit 58 and the battery 61 used in subordinate unit 50.

One electrode of charge terminals 63 is connected to one AC terminal of a bridge rectifier device 581, and the other electrode of charge terminals 63 is connected to the other AC terminal of the bridge rectifier device 581, whereby it is possible to connect charge terminals 63 to charge terminals 23 of master unit 10 regardless of the way the polarities of the terminals are combined with each other. Further, a positive terminal of bridge rectifier device 581 is connected to the positive pole of battery 61 through a parallel-connected circuit consisting of resistors 582 and 583 of 120 Ω, and, at the same time, to a data detection terminal 585 through a resistor 584 of 10 kΩ.

Data detection terminal 585 is connected to the collector of a transistor 586 of the 2SC2712G standard. The emitter of transistor 586 is connected to the earth electrode of subordinate unit 50. The base of transistor 586 is connected to the earth electrode through a series-connected circuit consisting of resistors 587 and 588 of 3.3 kΩ. The nodes of these resistors 587 and 588 are connected to one electrode of charge terminals 63 through a resistor 589 of 3.9 kΩ, and to the other electrode of charge terminals 63 through a resistor 590 of 3.9 kΩ. One electrode of charge terminals 63 is connected to the earth electrode through a capacitor 591 of 0.001 µF, and the other electrode of charge terminals 63 is connected to the earth electrode through a capacitor 592 of 0.001 µF.

The negative pole of battery 61 is connected to the earth electrode of subordinate unit 50. An electrolytic capacitor 580 is connected between the positive and negative poles of battery 61. The emitter of a transistor 593 is connected to the positive terminal of bridge rectifier device 581, and the collector of transistor 593 is connected to the positive pole of battery 61, the base of the transistor being adapted to receive a charge control signal. Data detection terminal 585 is connected to control unit 55 of subordinate unit 50. Negative terminal of bridge rectifier device 581 is connected to the earth electrode of subordinate unit 50.

[Operation]

Figure 8:
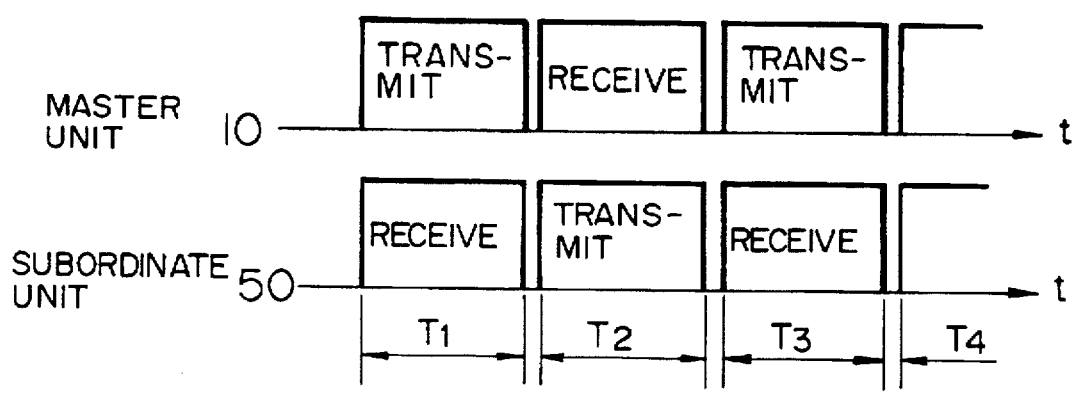
FIG. 8 is a timing chart illustrating the communication between a master unit and a subordinate unit in the embodiment.
Figure 9:
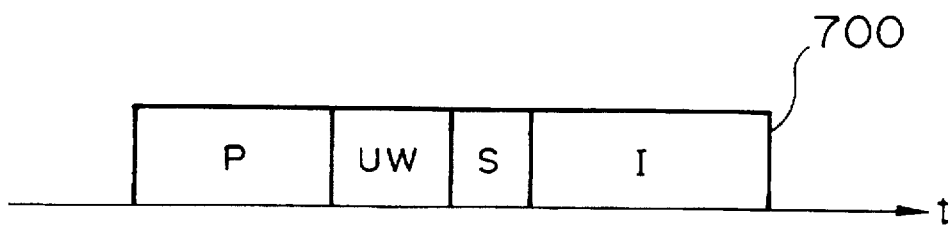
FIG. 9 is an illustration of an example of data transmitted through a radio circuit.
Figure 10:
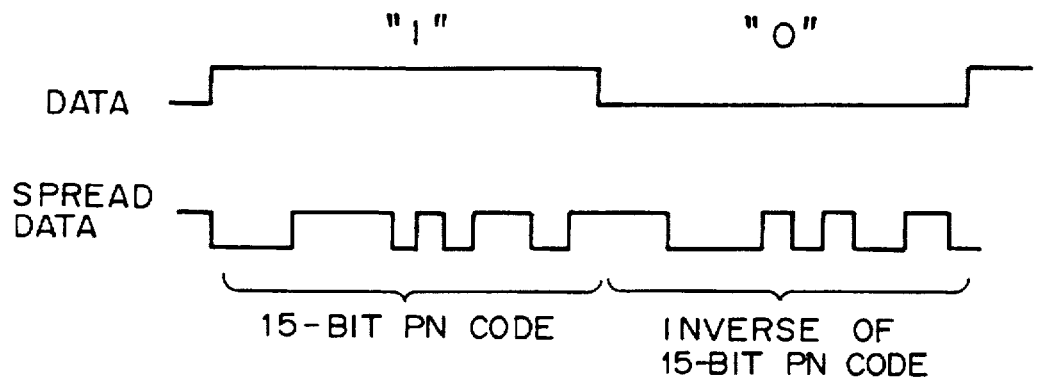
FIG. 10 is a timing chart illustrating the state of spread of data transmitted through the radio circuit.
Figure 11:
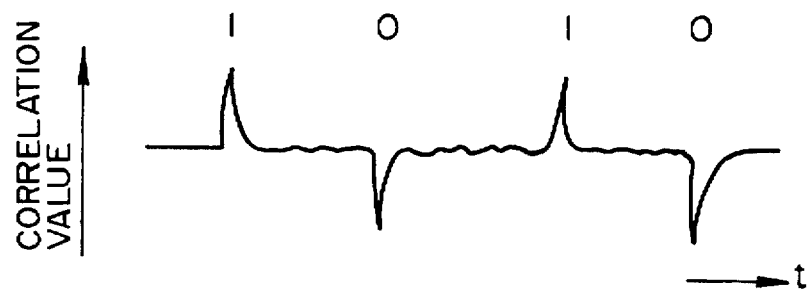
FIG. 11 is a timing chart illustrating the operation of the correlation detecting circuit in the SS transceiver used in the embodiment.
Figure 12:
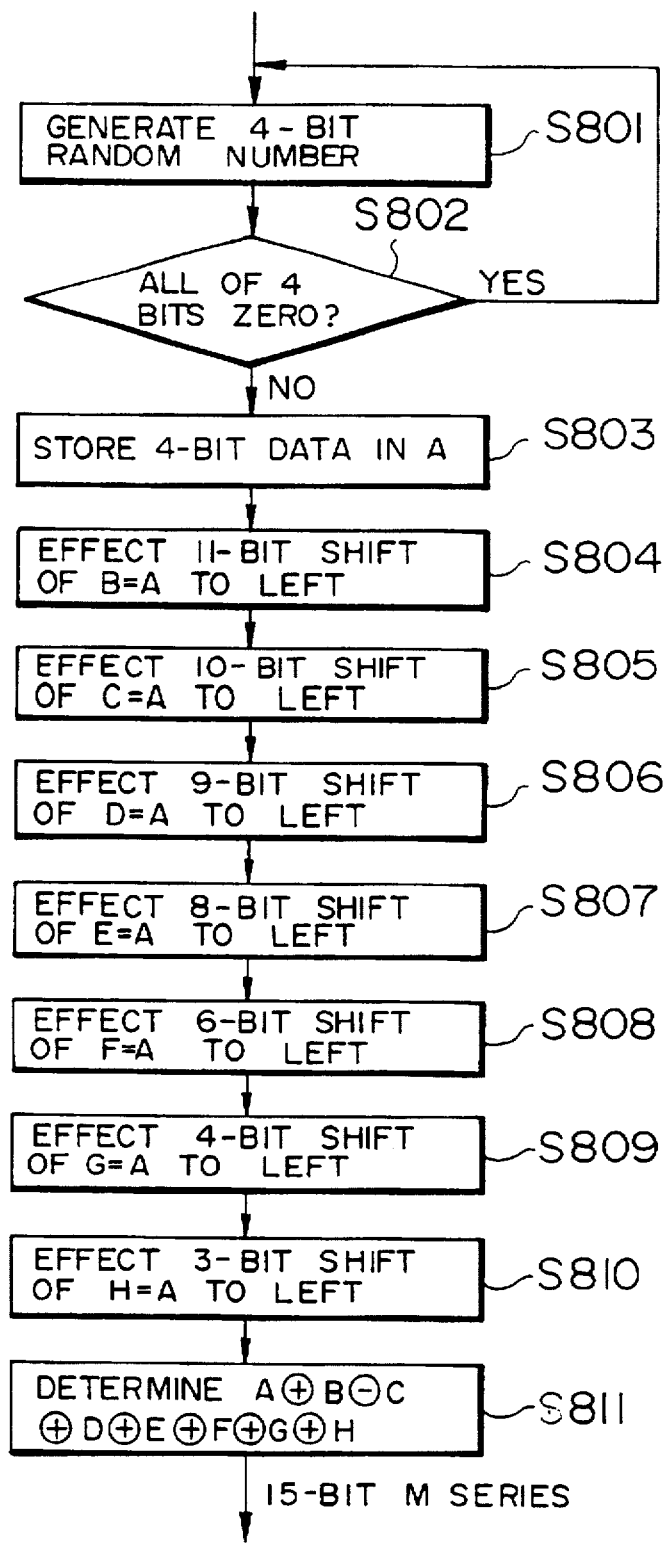
FIG. 12 is a flow chart illustrating the operation for generating spread code series in the embodiment.

The operation of this cordless telephone, constructed as described above, will now be described with reference to FIGS. 8 through 11 based on FIGS. 1 through 7. FIG. 8 is a timing chart showing how transmission and reception are effected between master unit 10 and subordinate unit 50. In the drawing, the horizontal axis indicates time, and the vertical axis indicates the operations of master unit 10 and subordinate unit 50. FIG. 9 illustrates the form of a code used in the data transfer between master unit 10 and subordinate unit 50. FIG. 10 is a timing chart showing the relationship between spread code series and baseband data. In the drawing, the horizontal axis indicates time, and the vertical axis indicates data and spread data. FIG. 11 is a timing chart for illustrating the operation of correlation circuit 117 of FIG. 4. In FIG. 11, the horizontal axis indicates time, and the vertical axis indicates correlation value. FIG. 12 is a flow chart illustrating an example of the way a spread code series is formulated in control unit 15 of master unit 10.

[Ordinary Operation]

Prior to illustration of operation of this embodiment, the ordinary operation of a cordless telephone will be described.

In this cordless telephone, all the signals transferred through the radio circuits are digital signals. In the radio circuits of this embodiment, the signal transfer is effected by using the same frequency $f_1$. However, it is also possible to use different frequencies $f_1$ and $f_2$.

In this embodiment, which uses the same frequency $f_1$, switching is alternately effected between transmission and reception (the so-called ping-pong transfer system). Thus, as shown in FIG. 8, for a period $T_1$, the master unit 10 performs transmission, and subordinate unit 50 performs reception. For the next period $T_2$, master unit 10 performs reception, and subordinate unit 50 performs transmission. For the next period $T_3$, master unit 10 again performs transmission, and subordinate unit 50 performs reception.

In such a state, the data transmitted is in a burst-like form. As shown in FIG. 9, this burst-like data 700 is composed of: a preamble bit P for bit synchronization, a unique word UW providing timing for burst frame data (which indicates where the information begins), a status bit S for transmitting control data, and digital sound data I.

In this data 700, a spread code series is allocated to each bit of data before the data is sent out. As shown in FIG. 10(a), in the case, for example, of data having the form: "1", "0", the data portion "1" consists of data spread by a 15-bit PN code, and the data portion "0" consists of data spread by an inverse of the 15-bit PN code.

When there is an incoming signal from telephone line 12 and a ringing tone makes itself heard, a change in the voltage of telephone line 12 is detected in line interface circuit 13 of master unit 10, thereby notifying control unit 15 of the incoming signal. Control unit 15 transmits a frequency control signal Cf to local oscillator 123 of SS transceiver 16 in order to set the radio frequency of SS transceiver 16 to an appropriate frequency fo, thereby effecting the frequency setting. Then, control unit 15 activates SS transceiver 16 to bring it to the transmission state, transmitting its ID (identification number) together with control data, or control data alone.

In subordinate unit 50, when the transmission frequency fo is known beforehand, this fo is transmitted to SS transceiver 52; when it is not known, the frequency control signals Cf of all the frequency channels fo fN are transmitted to SS transceiver 52. When, upon reception of the frequencies, it is determined that the signals are being transmitted, and its ID number is detected among the received control data, the ID number is sent back to master unit 10 as control data.

Master unit 10 checks the ID number from subordinate unit 50. When the ID numbers agree with each other, master unit 10 sends information to the subordinate unit to the effect that there is an incoming signal. Master unit 10 may send the information simultaneously with the sending of the ID number.

In subordinate unit 50, control unit 55 receives the incoming information from master unit 10, and drives a ringer (not shown) of subordinate unit 50 to cause an incoming ring to be heard. When a hook switch (not shown) of subordinate unit 50 is pushed down, control unit 55 detects this and stops the incoming ring, and, at the same time, transmits information, which is indicative of the pushing down of the hook switch, to master unit 10.

Upon receiving the information from subordinate unit 50, which is indicative of the pushing down of the hook switch, control unit 15 controls a hook switch (not shown) of line interface circuit 13 to put it into the OFF-hook state, whereby a telephone call becomes possible.

It goes without saying that, when performing radio communication, the frequency setting operation and the ID number checking operation between the master unit and the subordinate unit are executed not only prior to an incoming or outgoing telephone call, but also when spread code setting or the like is performed.

Further, line interface circuit 13 of master unit 10 has a telephone terminal connected to telephone line 12, a receiving speech terminal for exclusively sending out signals of a receiving speech system, and a sending speech terminal for exclusively sending out the signals of a sending speech system. A receiving speech sound signal Sr from telephone line 12 is sent out from the receiving speech terminal; a sending speech sound signal St of master unit 10 is input to the sending speech terminal; and both the receiving speech sound signal and the sending speech sound signal are input and output to and from the telephone terminal.

[Operation of Master Unit 10]

The sound signal from the telephone line is input to CODEC 14 as the receiving speech sound signal Sr by line interface circuit 13. The sending speech sound signal St from CODEC 14 is transmitted to telephone line 12 when supplied to the sending-speech circuit.

This receiving speech sound signal Sr is converted into a digital sound signal Dsr by CODEC 14, and then input to SS transceiver 16. Further, SS transceiver 16 is normally supplied with spread code series PNa stored in RAM 17.

In SS transceiver 16, digital sound signal Dsr undergoes time division multiplexing by framer circuit 122 to become a short, burst-like signal. After this, short, burst-like signal is sent out from framer circuit 122 it is EXCLUSIVE-ORed with spread code series PNa by EXCLUSIVE-OR circuit 102, and the result is input to modulator 103 in order to undergo modulation. Subsequently, modulated signal output from modulator 103 is mixed with the local oscillation frequency supplied from local oscillator 123, by mixer circuit 104, whereby it is frequency-converted to a signal having target frequency. The high-frequency signal from mixer circuit 104 is power-amplified by power amplifier 105, and then conveyed through switch 124 to be transmitted from antenna 125 (which is antenna 11 in this case).

On other hand, on the reception side of master unit 10, the high-frequency signal induced at antenna 11 is input to radio-frequency amplifier 112 through switch 124. This high-frequency signal is high-frequency-amplified by radio-frequency amplifier 112, and then input to mixer circuit 113, which is supplied with the local oscillation frequency from local oscillator 123. In mixer circuit 113, the high-frequency signal is frequency-modulated with the local oscillation frequency, and attains a desired intermediate frequency at intermediate-frequency filter 114. Then, it undergoes intermediate amplification at intermediate-frequency amplifier 115, and is supplied to demodulator 116. The demodulated output signal from demodulator 116 is compared with spread code series PNo (which is PNa since it is in master unit 10) by correlation circuit 117 for the correlation detection.

As shown in FIG. 4, the data received from demodulator 116 is input to register 1171 to become a parallel signal. Further, the spread code series PNo is input to register 1172 to become a parallel signal. These parallel signals are compared with each other by comparator 1173. Suppose, for example, a signal having the form: "1, 0, 1, 0" has been transmitted on spread spectrum transmission system and received. When a correlation between them is obtained, a signal which exhibits a positive peak value at one time and a negative peak value at another, as shown in FIG. 11, is obtained from the output terminal of comparator 1173. Thus, from the values and signs of these peaks, it can be determined that the signal has the form: "1, 0, 1, 0."

This is due to the fact that spread code series has an excellent auto-correlation characteristic; it exhibits a high correlation value only when there is perfect agreement; otherwise, it exhibits no correlation. When the bit of sound data, etc. is "1," spreading is effected with ordinary spread code series PN, and, when the bit is "0," with inverted spread code series PN (See FIG. 10), so that the received correlation output exhibits a wave form having upper and lower peaks as shown in FIG. 11. Accordingly, it is possible to discriminate between "1" and "0" according to whether the peak is an upper or lower one.

The data thus obtained from correlation circuit 117 is input to clock recover circuit 118 and framer circuit 122. Clock recover circuit 118 detects the timing from the above data and supplies it to framer circuit 122. Framer circuit 122 demodulates the base-band data from the above data and clock. Framer circuit 122 outputs a digital sound signal from the demodulated base-band data.

A frequency control signal Cf for controlling the transmitting/receiving frequency is supplied from control unit 15 to local oscillator 123, whereby switching to a predetermined frequency band is possible. Further, a spread code series PNo is supplied from RAM 17 or ROM 20 under the control of control unit 15. Further, transmission and reception of control data Dct, passed between master unit 10 and subordinate unit 50, is effected between framer circuit 122 and control unit 15.

As described above, digital sound signal Dst obtained in SS transceiver 16 is converted to an analog sending speech sound signal St by CODEC 14. This analog sending speech sound signal St is transmitted to telephone line 12 through line interface circuit 13.

[Operation of Subordinate Unit 50]

On the other hand, subordinate unit 50 operates as follows: a high-frequency signal induced at antenna 51 is input to SS transceiver 52. The operation of SS transceiver 52 with regard to the reception is the same as that of SS transceiver 16 of master unit 10, so a detailed description thereof will be omitted. Digital sound signal Drr demodulated by SS transceiver 52 is input to CODEC 53, which converts input digital sound signal Drr to an analog signal and supplies it to speaker 56, whereby a sound is output from speaker 56.

A sound picked up by microphone 54 is converted to a sound signal and input to CODEC 53, which converts the sound signal from microphone 54 to a digital sound signal Drt. Digital sound signal Drt thus obtained through conversion is input to SS transceiver 52, from which a spectrum-spread, high-frequency signal is output and transmitted through antenna 51. The details on the operation of SS transceiver 52 with regard to the transmission is the same as those of SS transceiver 16 of master unit 10, so a description thereof will be omitted.

[Spread Code Series Setting Operation]

Next, the operation of the setting spread code series will be explained.

[Spread Code Setting through Wire]

Figure 13A:
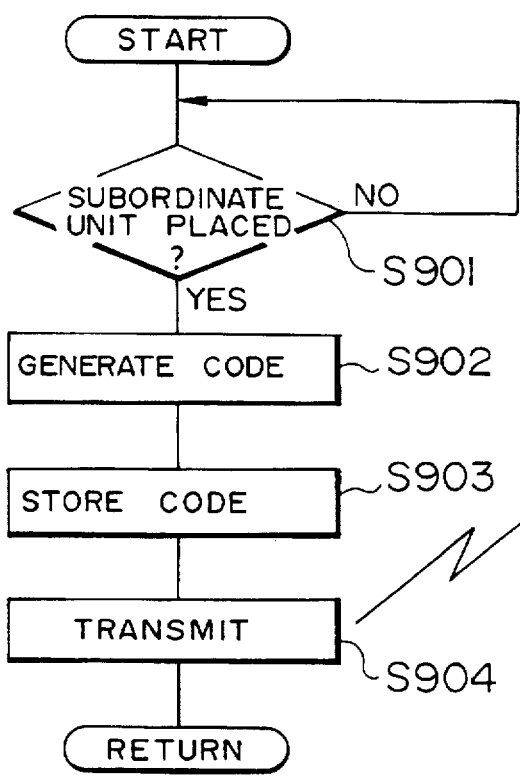
FIGS. 13A and 13B are flow charts illustrating an operation for setting spread code series by using a cable circuit in the embodiment.
Figure 13B:
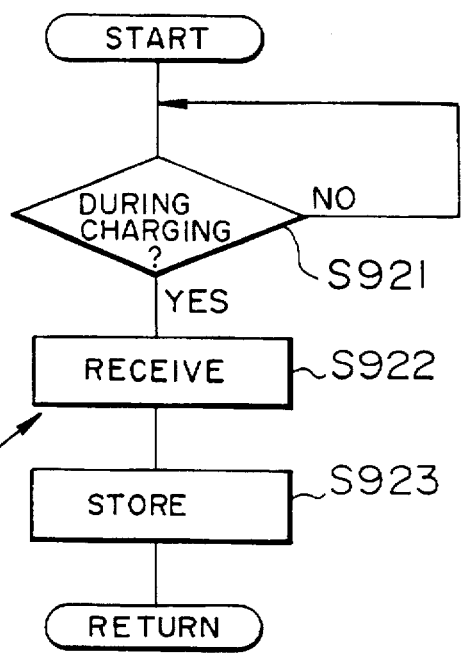

FIGS. 13(a) and 13(b) are flow charts for illustrating a spread code series setting through the cable, of which FIG. 13(a) shows the operation of the master unit, and FIG. 13(b) shows the operation of the subordinate unit.

In master unit 10, the AC voltage of a commercial power source is transformed by a power transformer 26, and the transformed AC voltage is converted to a DC voltage by rectifier bridge 27, and, after the voltage is stabilized by regulator 28, each circuit is supplied with voltage. One of the outputs from regulator 28 serves as power for charging the battery of subordinate unit 50.

When subordinate unit 50 is placed in the subordinate-unit rest of master unit 10, and charge terminals 63 of subordinate unit 50 are connected to charge terminals 23, transistor 211 turns on, whereby current flows to the base of transistor 218 to turn it on, thereby starting the charging of battery 61 of subordinate unit 50. Further, when transistor 218 turns on, a voltage is generated in resistor 221, and current flows into the base of transistor 222 through resistor 223, thereby turning on transistor 222. This causes charge detection terminal 214 to exhibit a value close to earth level ("L" level), of which CPU 151 is notified through I/O port 154 of control unit 15. Thus, by receiving this notification, CPU 151 of control unit 15 is informed of the connection between master unit 10 and subordinate unit 50 through the cable (step 901 of FIG. 13(a)).

Upon receipt of this notification of charging, CPU 151 of control unit 15 generates a new arbitrary spread code series (step 901), which is stored in RAM 17 (step 903). Here, it will be assumed that an M spread code series is to be generated.

The M series is a series generated by h(x) which satisfies the following equation $G(x) \cdot h(x) = x^{15} + 1$ with respect to a generating polynomial:

$$G(x) = x^4 + x^3 + 1 \tag{1}$$

Thus, h(x) can be expressed as follows:

$$\begin{aligned} h(x) &= (x^{15}+1)/(x^4+x^3+1) \\ &= x^{11}+x^{10}+x^9+x^8+x^6+x^4+x^3+1 \end{aligned} \tag{2}$$

Accordingly, it is possible to generate an M series by multiplying any arbitrary 4-bit code that is not 0 by h(x). Thus, CPU 151 of control unit 15 realizes a relationship as expressed by equation (2) by executing the operation of the flow chart of FIG. 12.

CPU 151 generates 4-bit random numbers in accordance with a program stored in ROM 153 (step 801). Then, CPU 151 makes a judgment as to whether the generated random numbers are all 0 or not (step 802). If they are all 0 (step 802; NO), it generates random numbers again (step 801). When CPU 151 determines that not all of the generated random numbers are 0 (step 805; YES), it stores 4-bit data in area A of RAM 152 (step 803).

Next, CPU 151 shifts data in area A 11 bits to the left to store it in area B (step 804), shifts data in area A 10 bits to the left to store it in area C (step 805), shifts data in area A 9 bits to the left to store it in area D (step 806), shifts data in area A 8 bits to the left to store it in area E (step 807), shifts data in area A 6 bits to the left to store it in area F (step 808), shifts data in area A 4 bits to the left to store it in area G (step 809), and shifts data in area A 8 bits to the left to store it in area H (step 810). Finally, data stored in areas A through G is subjected to EXCLUSIVE-OR operation (step 811) to prepare the 15-bit M spread code series, which are stored in RAM 17.

Subsequently, control unit 15 supplies new spread code series stored in RAM 17 to data transmission circuit 18 as data DT, whereby data transmission circuit 18 transmits data to the cable circuit composed of charge terminals 23 of master unit 10 and charger terminals 63 of subordinate unit 50 (step 904). This transmission of data is effected as follows: The new spread code series, as data DT, is supplied to data input terminal 220 of data transmission circuit 18.

This data DT is applied to the base of transistor 218 from data input terminal 220. Assuming, for example, that the signal level is "H" (high) when data DT is "1," and that the signal level is "L" (low) when data DT is "0," transistor 218 turns on when data DT is "1" to cause a charging current to flow to subordinate unit 50, and transistor 218 turns off when data DT is "0" to cause no charging current to flow to subordinate unit 50. Thus, data DT is transmitted to subordinate unit 50 as a signal indicative of whether the charging current flows to subordinate unit 50 or not.

When subordinate unit 50 is placed in the subordinate-unit rest in master unit 10, charge terminals 23 of master unit 10 and charge terminals 63 of subordinate unit 50 are connected to each other to charge battery 61 through data detection circuit 58 of subordinate unit 50. At the same time, the data DT, which has become a signal indicative of whether charging current flows or not, is detected at data detection circuit 58. When the charging current ceases to flow, transistor 586 of data detection circuit 58 turns off to cause data detection terminal 585 to attain "H" level ("1"), and when the charging current flows, transistor 586 turns off to cause data detection terminal 585 to attain "L" level ("0").

Control unit 55 of subordinate unit 50 monitors to check whether there is a detection signal Dc from data detection terminal 585 (step 921 of FIG. 13(b); NO). When the detection signal Dc from data detection terminal 585 is supplied to control unit 55 (step 921; YES), control unit 55 receives the data DT, received by data detection circuit 58, as the spread code series (step 922) and stores it in RAM 57 (step 923). In this way, the spread code series setting through the cable is completed. When the transmission of the spread code series has been completed, control unit 15 of control unit 10 ceases to transmit data DT to the data transmission circuit 18. In the above setting operation, switching means 19 of master unit 10 is constantly set to the RAM 17 side, and switching means 59 of subordinate unit 50 is constantly set to the RAM 57 side.

In this embodiment, the above-described setting operation is executed each time subordinate unit 50 is placed in the subordinate-unit rest of master unit 10. When an incoming or outgoing telephone call is to be made, master unit 10 uses the spread code series PNa, set at RAM 17 through the above operation, and subordinate unit 50 uses the spread code series PNb (=PNa), set at RAM 57 through the above operation, to perform communication.

In accordance with this embodiment, there is no need to provide a special device for writing spread code series. Further, since a new spread code series is set each time subordinate unit 50 is placed in master unit 10, the possibility of the subordinate unit sharing the same spread code series with another subordinate unit is markedly reduced, thereby attaining a substantial improvement in terms of a privacy securing property. In addition, since the spread code series is transmitted from master unit 10 to subordinate unit 50 through the cable, there is no risk of the spread code series being set in another unit, thereby preventing the spread code series from becoming known to another party.

[Wireless Setting of Spread Code Series]

Figure 14A:
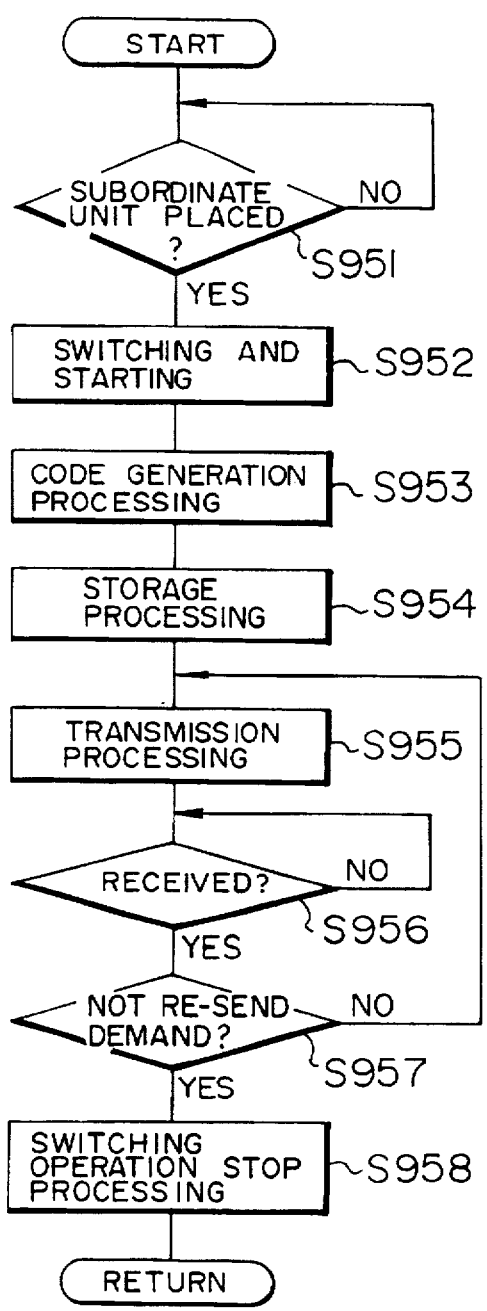
FIGS. 14A and 14B are flow charts illustrating an operation for setting spread code series by using a radio circuit in the embodiment.
Figure 14B:
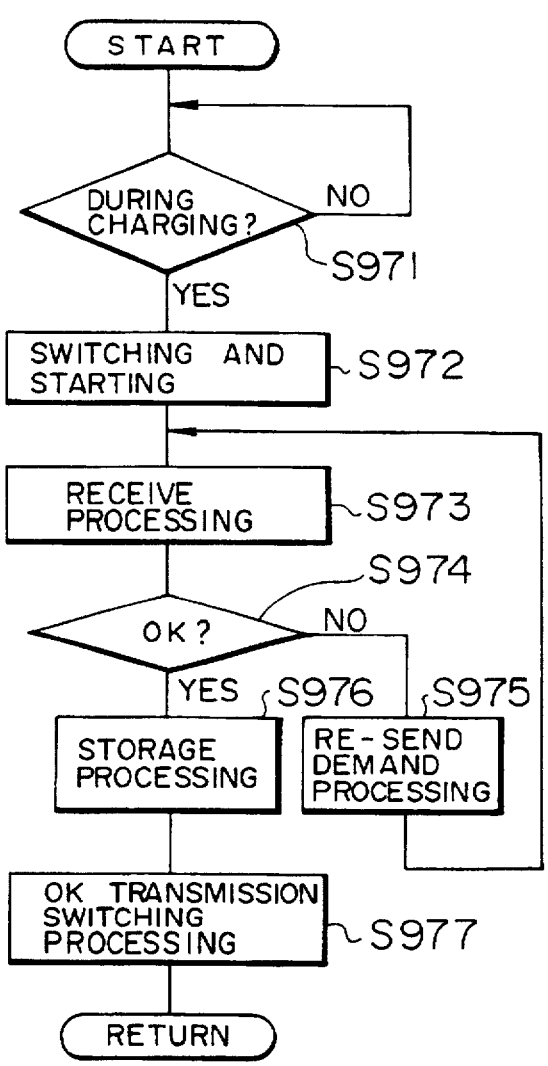

Next, a radio setting of spread code series will be described with reference to the flow chart of FIGS. 14(a) and 14(b). FIG. 14(a) shows the operation of the master unit, and the FIG. 14(b) shows the operation of the subordinate unit.

In this case, master unit 10 uses the spread code series PN of spread code series [φ], set at ROM 20, and subordinate unit 50 uses the spread code series PN of the spread code series [φ], set at ROM 60, to effect communication. In this case, the spread code series used is one for setting spread code series, and not one for making telephone calls, so that the same spread code series is applicable to all models, although it is naturally possible for the spread code series to differ from lot to lot or from model to model.

When subordinate unit 50 is placed in the subordinate-unit rest of master unit 10 to start charging, charge detection terminal 214 of current detection circuit 21 attains a value close to the earth level ("L" level), of which CPU 151 is notified through I/O port 154 of control unit 15 (step 951 of FIG. 14(a).

Then, control unit 15 starts SS transceiver 16 and, at the same time, switches switching means 19 to the ROM 20 side (step 952), whereby SS transceiver 16 is supplied with the spread code series PNa of the spread code series [φ].

Subsequently, control unit 15 operates in the above-described manner to generate a spread code series (step 953). Control unit 15 stores the generated spread code series in RAM 17 (step 954). This spread code series is input to SS transceiver 16 by control unit 15 as data Da. SS transceiver 16 spreads this data Da, i.e., the spread code series, with the spread code series [φ] from ROM 20 and transmits it to the radio circuit through antenna 11 (step 955).

When charging is being performed in subordinate unit 50, (step 971 of FIG. 14(b); YES), control unit 55 switches switching means 59 to the ROM 60 side, and starts SS transceiver 52 (step 972). Then, SS transceiver 52 communicates with master unit 10 by the spread code series [φ] stored in ROM 60, supplying control data Db, received from SS transceiver 52 and inversely spread, to control unit 55 (step 973). Control unit 55 examines this new spread code series transmitted from master unit 10 to check whether there is any bit deficiency, etc. or not (step 972).

When a bit deficiency or the like is found to have been generated (step 974; NO), control unit 55 transmits a re-send demand to the radio circuit (step 975). When no bit deficiency or the like has been generated (step 974; YES), control unit 55 stores the spread code series in RAM 57 (step 976).

When the new spread code series has thus been set and stored in RAM 57, subordinate unit 50 issues a "communication completed" signal and stops the operation of SS transceiver 52 to terminate communication with master unit 10, and, at the same time, switches switching means 59 to the RAM 57 side (step 977).

When the transmission of the spread code series has been completed, master unit 10 enters a reception wait state (step 956; NO). When master unit 10 receives a signal from subordinate unit 50 (step 956; YES), control unit 15 makes a judgement as to whether the received signal indicates a resend demand or OK (step 957; YES). When the received signal indicates a re-send demand (step 957; NO), the spread code series stored in RAM 17 is supplied to SS transceiver 16 again, transmitting it to radio circuit (step 955). Then, master unit 10 enters the reception wait state again (step 956; NO).

When master unit 10 receives a response from subordinate unit 50 (step 956; YES) and a signal indicating "OK" (step 957; YES), the operation of SS transceiver 16 is stopped, and switching means 19 is switched to the RAM 17 side (step 958), thereby ending the processing.

Subsequently, when an incoming or outgoing telephone communication is to be performed, master unit 10 uses the spread code series PNa set at RAM 17 by the above-described operation, and subordinate unit 50 uses the spread code series PNb (=PNa) set at RAM 57 by the above-described operation.

In accordance with this embodiment, there is no need to provide a special device for writing spread code series. Further, since a new spread code series is set each time subordinate unit 50 is placed in master unit 10, the possibility of the subordinate unit sharing the same spread code series with another subordinate unit is markedly reduced, thereby substantially enhancing the privacy securing function. In addition, since the spread code data is spread with a constant spread code series [φ] before it is transmitted from master unit 10 to subordinate unit 50 through the radio circuit, the risk of the spread code series being set in another apparatus is markedly reduced. Further, the spread code data is prevented from becoming known to another party.

While in the above embodiment the spread code series is set through the radio circuit when subordinate unit 50 is placed in the subordinate-unit rest of master unit 10, it is also possible to set the spread code series from master unit 10 to subordinate unit 50 by spreading the above spread code series with a constant spread code series [φ], for example, before or after making an incoming or outgoing telephone call. In this case, subordinate unit 50 may be set not only in master unit 10 but also in other places.

[Spread Code Series Setting by Both Wire and Wireless Systems]

Figure 15A:
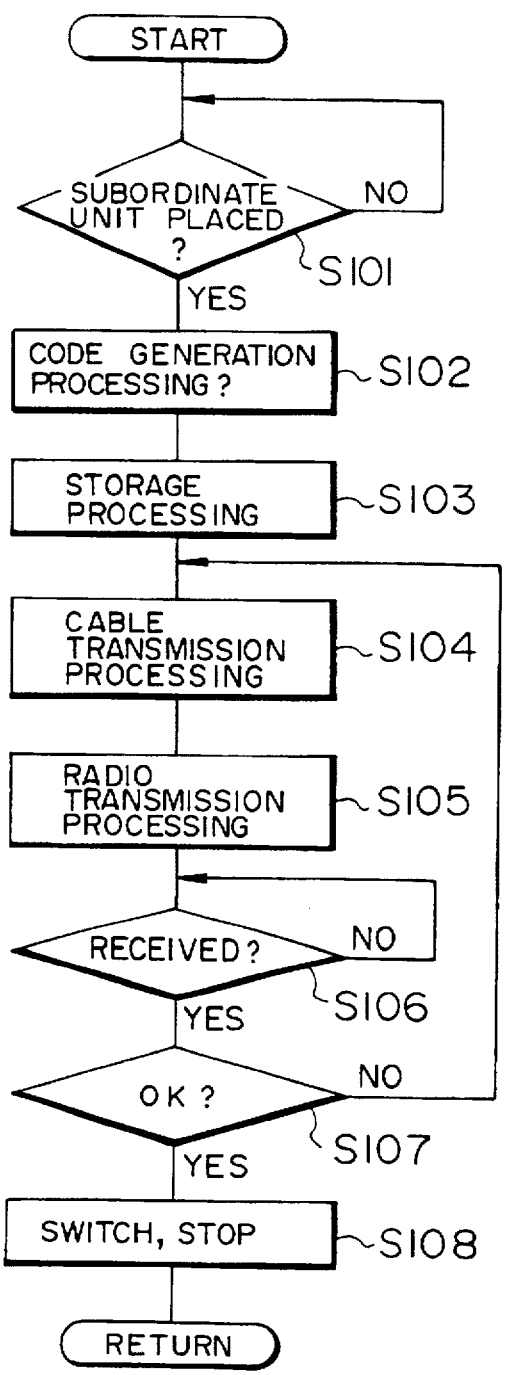
FIGS. 15A and 15B are flow charts illustrating an operation for setting spread code series by simultaneously using both the radio circuit and the cable circuit in the embodiment.
Figure 15B:
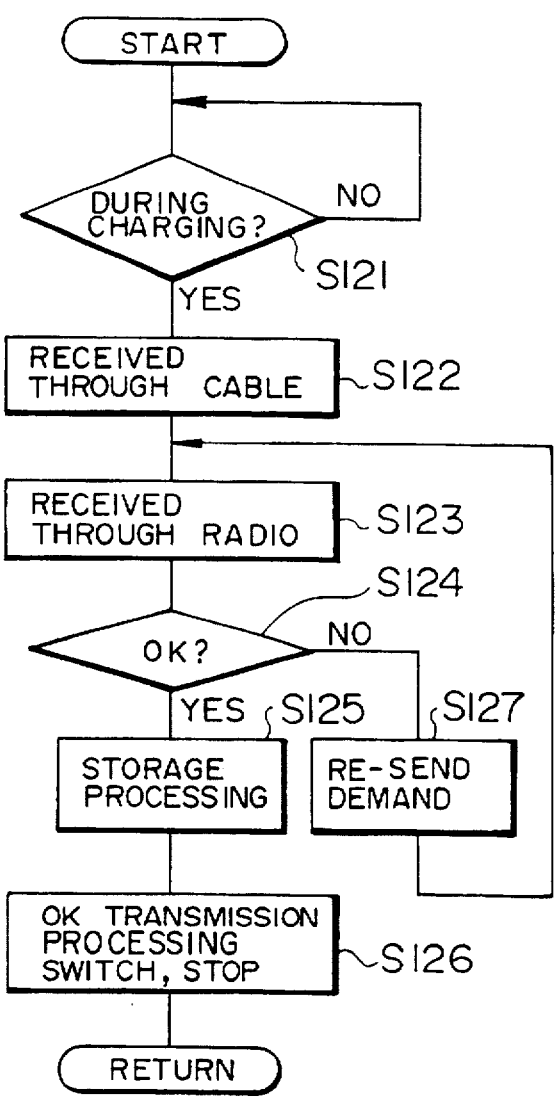

Next, a spread code series setting by both cable and radio systems will be described with reference to the flow charts of FIGS. 15(a) and 15(b). FIG. 15(a) illustrates the operation of the master unit, and FIG. 15(b) illustrates the operation of the subordinate unit.

First, on the cable side, when subordinate unit 50 is placed in the subordinate-unit rest of master unit 10 (step 101 of FIG. 15(a); YES), master unit 10 operates in the manner as described above to generate a spread code series (step 102). Then, in master unit 10, the spread code series is stored in RAM 17 (step 103). The new spread code series data is transmitted to subordinate unit 50 through the data transmission circuit 18 and the charge terminals 23 (step 104). In subordinate unit 50, the data is supplied to control unit 55 as data on the new spread code series (step 121; YES, step 122).

On the radio side, communication is performed between master unit 10 and subordinate unit 50, with master unit 10 using the spread code series [φ] set at ROM 20 and subordinate unit 50 using the spread code series [φ] set at ROM 60, whereby data on the new spread code series stored in RAM 17 of master unit 10 is supplied to control unit 55 of subordinate unit 50 (steps 105, 123).

When there is no bit deficiency or the like in the spread code series newly obtained through the cable and radio systems, and the new spread code series obtained on the cable side and the new spread code series obtained on the radio side are found to be in agreement with each other upon comparison (step 124; YES), control unit 55 stores the spread code series in RAM 57 (step 125), and transmits control data indicating that the setting has been completed from SS transceiver 52 to master unit 10, and, at the same time, switches switching means 59 to RAM 57 side (step 126).

Upon receipt of the control data indicating the completion of the setting (step 106; YES, step 107; YES), switching means 19 of master unit 10 is switched to the RAM 17 side to stop the operation (step 201).

On the other hand, when it is determined that there is a bit deficiency or a discordance between the spread code series (step 124; NO), control unit 55 of subordinate unit 50 transmits control data from SS transceiver 52 demanding that a new spread code be transmitted again (step 127).

When the control data received by SS transceiver 16 indicates a re-send demand (step 106; YES, step 107; NO), master unit 10 reads a spread code series set in RAM 17, and sends out this spread code series as data by using the circuits on both the cable and radio sides (steps 104, 105).

Then, in subordinate unit 50, the data transmitted through the cable/radio circuits is received, and control unit 55 checks whether there is any bit deficiency or the like or not. Further, it compares the spread code series data obtained through the radio circuit and that obtained through the cable circuit with each other, and executes the above operations until an agreement in data is attained (steps 122, 123, 124; NO, step 127).

Master unit 10 operates in a similar manner (step 104, step 105, step 106; YES, step 107; NO).

In accordance with this embodiment, there is no need to provide a special device for writing spread code series. Further, since a new spread code series is set each time subordinate unit 50 is placed in master unit 10, the possibility of the subordinate unit sharing the same spread code series with another subordinate unit is markedly reduced, thereby substantially enhancing the privacy securing function of the system. In addition, since the spread code series is transmitted from master unit 10 to subordinate unit 50 through the cable, the risk of the spread code series being set in another apparatus is reduced. Furthermore, the spread code series is prevented from becoming known to another party. In addition, since both the cable and radio systems are used, the spread code series setting becomes accurate and reliable.

Figure 16:
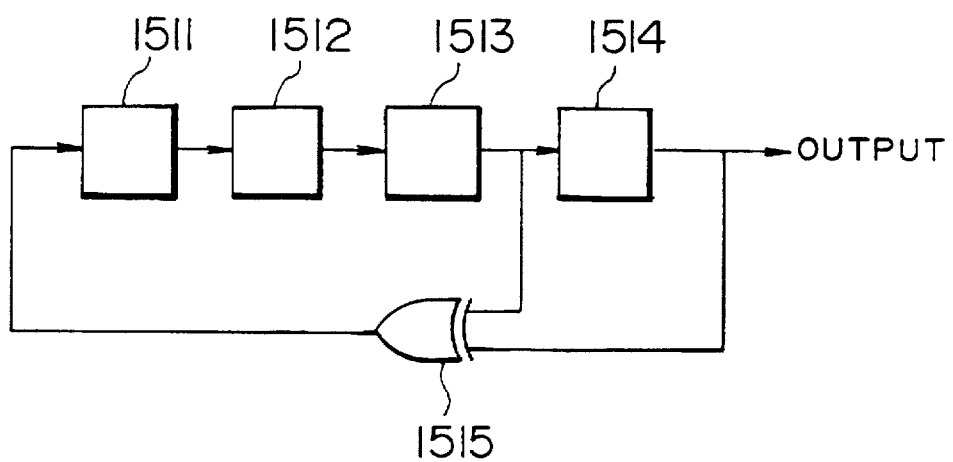
FIG. 16 is a block diagram showing the construction of a spread code series generating circuit used in the embodiment.

While in the above embodiments the generation of the spread code series is effected through software by control unit 15, it is also possible to generate them through hardware. FIG. 16 is a schematic block diagram showing an example in which the spread code series are generated through hardware.

The spread code series generating circuit shown in FIG. 16 comprises shift registers 1511, 1512, 1513 and 1514, and an EXCLUSIVE-OR circuit 1515. These components are connected in the following manner: the input terminal of shift register 1512 is connected to the output terminal of shift register 1511; the input terminal of shift register 1513 is connected to the output terminal of shift register 1512; and the input terminal of shift register 1514 is connected to the output terminal of shift register 1513.

Further, the output terminal of shift register 1513 is connected to one input terminal of the EXCLUSIVE-OR circuit 1515; and the output terminal of shift register 1514 is connected to the other input terminal of the EXCLUSIVE-OR circuit 1515. The output terminal of the EXCLUSIVE-OR circuit 1515 is connected to the input terminal of shift register 1511. A spread code series is extracted from the output terminal of shift register 1514.

At the initial setting, shift registers 1511, 1512, 1513 and 1514 are shifted by a clock of a constant speed adjusted such that the data of these shift registers will not become all zeros. By extracting successive 15 bit-data from the output terminal of shift register 1514 with an arbitrary timing, it is possible to extract random spread codes of M-series. The spread code series thus extracted from the output terminal of shift register 1514 is stored in RAM 17 under the control of control unit 15. Thus, it is also possible to use spread code series generated through hardware. By thus preparing the spread code series through hardware, there is no need to generate spread code series by control unit 15, so that it is advantageously possible for control unit 15 to attend to other operations.

[Other Embodiments]

Figure 17:
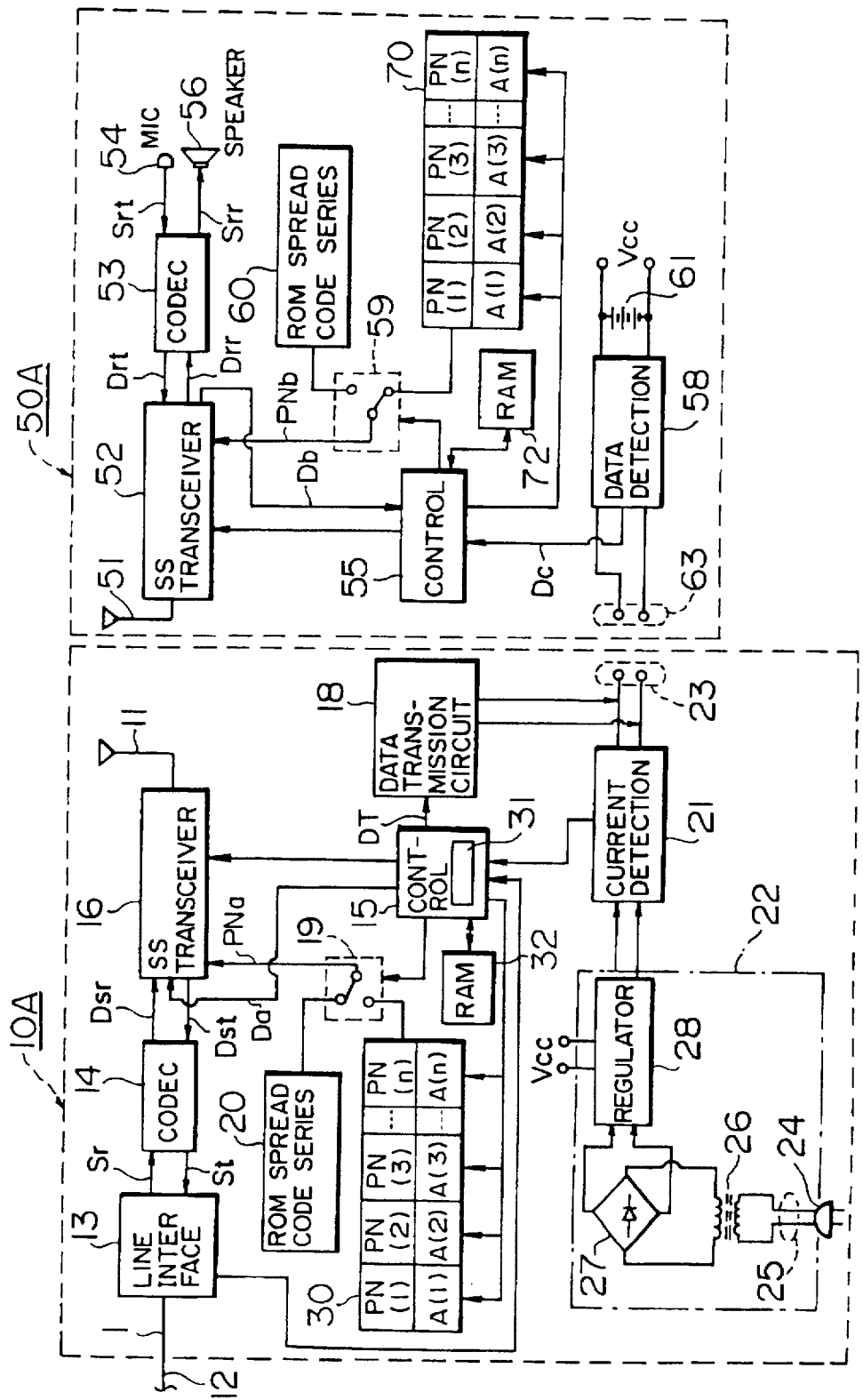
FIG. 17 is a block diagram showing the construction of a different embodiment.

FIG. 17 is a block diagram showing another embodiment of the present invention. In the embodiment shown in FIG. 17, a spread code series is not generated each time it is required, but a number of spread code series are stored in ROMs, etc., which are provided in both the master unit and the subordinate unit. Addresses of these ROMs are selected by means of random numbers or the like, and these addresses are set in the master and subordinate units, which communicate with each other by using the spread code series at the same address.

A master unit 10A, shown in this drawing, comprises, instead of RAM 17 of master unit 10 shown in FIG. 2, a ROM 30 for storing a limited number of spread code series PN(1), PN(2), PN(3), . . . , PN(N). Further, it comprises an address selection means 31, and an address storage means 32 for storing an address selected by address selection means 31. Apart from the above, master unit 10A has the same construction as master unit 10 of FIG. 2, so a further description of its construction will be omitted.

ROM 30 stores the spread code series PN(1), PN(2), PN(3), . . . , PN(N) at addresses A(1), A(2), A(3), . . . , A(N), respectively. Address selection means 31 generates, for example, random numbers, on the basis of which a desired address A(M) (M=1, 2, 3, . . . , N) is selected. Address selection means 31 is realized, for example, through execution of a program by the CPU 151 of control unit 15. When an address A(M) is supplied to ROM 30, a spread code series PNM at the address A(M) is supplied to SS transceiver 16 as the spread code series PNa.

Address storage means 32 is capable of storing the address A(M) selected by address selection means 31.

Further, a subordinate unit 50A comprises, instead of RAM 57 in subordinate unit 50 shown in FIG. 2, a ROM 70 for storing a limited number of spread code series PN(1), PN(2), PN(3), . . . , PN(N), which are the same as the limited number of spread code series PN(1), PN(2), PN(3), . . . , PN(N) stored in master unit 10A. Subordinate unit 50A further comprises an address storage means 72 for storing an address transmitted thereto from master unit 10A. Apart from the above, subordinate unit 50A has the same construction as subordinate unit 50 of FIG. 2, so a further description of its construction will be omitted.

ROM 70 stores the spread code series PN(1), PN(2), PN(3), . . . , PN(N) at addresses A(1), A(2), A(3), . . . , A(N), respectively (N is an arbitrary integer). Control unit 55 supplies a desired address A(M) (M=1, 2, 3, . . . , N) stored in address storage means 72 to ROM 70, whereby a spread code series PNM corresponding to the address A(M) is supplied to SS transceiver 52 as the spread code series PNb.

Address storage means 72 is capable of storing the address A(M), selected by address selection means 31 and transmitted thereto from master unit 10A. In subordinate unit 50A, control unit 55 supplies that address A(M) to address selection means 71 on the basis of the address A(M) stored in address storage means 72, supplying the spread code series PNM at the address A(M) to SS transceiver 52 as the spread code series PNb.

Figure 18A:
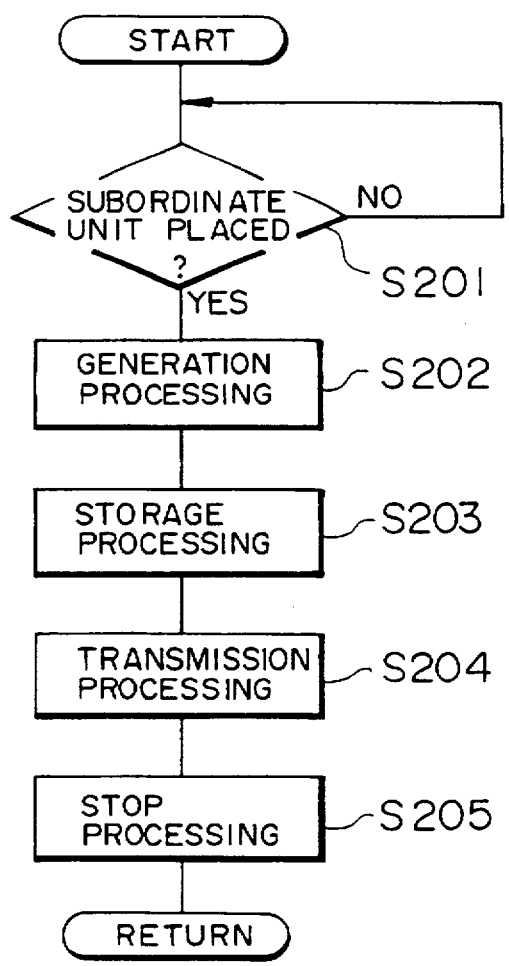
FIGS. 18A and 18B are flow charts illustrating the operation of the embodiment shown in FIG. 16.
Figure 18B:
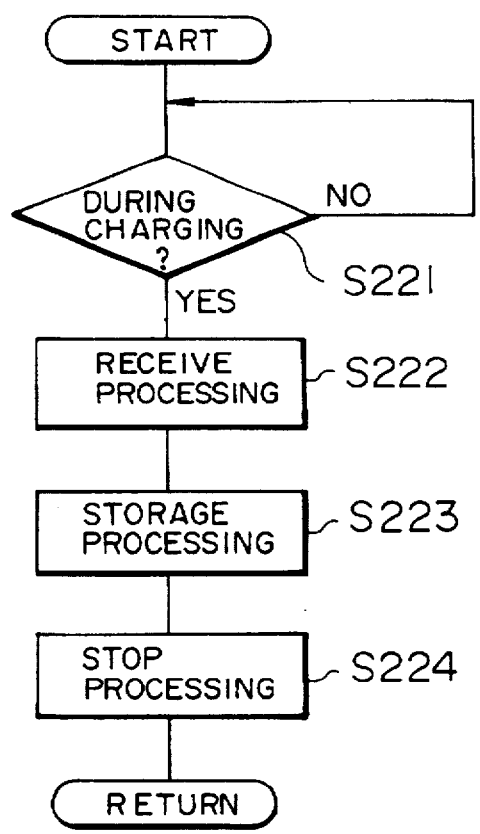

The operation of this embodiment will be described with reference also to the flow charts of FIGS. 18(a) and 18(b), of which FIG. 18(a) illustrates the operation of the master unit, and FIG. 18(b) illustrates the operation of the subordinate unit.

When subordinate unit 50A is placed in a predetermined subordinate-unit rest in master unit 10A, this is detected by the current detection circuit 21 (step 201; YES), so that predetermined random numbers are generated in address selection means 31, and on the basis of the random numbers, an address A(M) is determined (step 202). The address A(M) is supplied to ROM 30 by control unit 15, and, at the same time, stored in address storage means 32 (step 203).

In the case of radio setting, control unit 15 of master unit 10A activates SS transceiver 16, and, at the same time, switches switching means 19 to the ROM 20 side so that spreading can be effected with the spread code series [0] of ROM 20. Then, the address A(M) data stored in address storage means 32 is supplied to SS transceiver 16 by control unit 15, whereby the data is spread and transmitted to the radio circuit from the antenna 11 (step 204).

In subordinate unit 50A, switching means 59 has been switched to the ROM 60 side by control unit 55, so that spread transmission/reception is possible with the spread code series [φ]. The data received through the antenna 51 is subjected to inverse spreading at SS transceiver 16 by the spread code series [φ] and supplied to control unit 55 (step 222).

Control unit 55 causes the data to be stored in address storage means 72 (step 223). The address A(M) stored in address storage means 72 is supplied to ROM 70 by control unit 55, whereby the same address A(M) as that in master unit 10 is set at ROM 70, and the spread code series at the address A(M) is supplied to SS transceiver 52.

When the setting has thus been completed, control unit 55 transmits a "setting complete" signal to master unit 10A and switches switching means 50 to the ROM 70 side, thereby terminating the operation (steps 205 and 224).

In the case of setting through the cable, master unit 10A detects, as in the case of radio setting, subordinate unit 50A when it is placed in its predetermined subordinate-unit holding section through the current detection circuit 21 (step 201), and generates predetermined random numbers at address selection means 31, determining the address A(M) on the basis of the random numbers (step 202). The address A(M) is caused to be stored in address storage means 32 by control unit 15 (step 203).

Control unit 15 reads the set address A(M) from address storage means 32 and supplies it to the data transmission circuit 18 as data DT. The data transmission circuit 18 supplies the data to the data detection circuit 58 of subordinate unit 50A as data indicative of whether there is any charging current or not. In this case, switching means 19 is constantly switched to the ROM 30 side. When the data transmission is finished (step 204), the operation is stopped (step 205).

In subordinate unit 50A, data detection circuit 58 converts the data indicative of whether there is a charging current or not to ordinary "1"/"0" data and supplies it to control unit 55 (steps 221 and 222), whereby control unit 55 supplies the data to address storage means 73 for storage as the address A(M) (step 223). Further, the address A(M) stored in the address storage means 73 is supplied to ROM 70 by control unit 15. With this setting, the operation is completed (step 224).

In this state, switching means 59 has been switched to the ROM 70 side, so that the spread code series PNb can be supplied to SS transceiver 52.

As described above, in this embodiment, a ROM 30 having a limited number of spread code series PN(1), PN(2), PN(3), . . . , PN(N) is provided in master unit 10A, and a ROM 70 having the same spread code series PN(1), PN(2), PN(3), . . . , PN(N) is provided in subordinate unit 50A, wherein master unit 10A sets a predetermined address A(M) from the spread code series PN(1), PN(2), PN(3), . . . , PN(N) on the basis of random numbers or the like, and selects the spread code series PN(M) at this address A(M), supplying data on this address A(M) to subordinate unit 50A to set it therein.

Due to this arrangement, if a ROM having a limited number of spread code series PN(1), PN(2), PN(3), . . . , PN(N) is applied to ROMs 30 and 70 of all the master and subordinate units 10A and 50A, the possibility of the same spread code series being set can be reduced by appropriately selecting the number of spread code series and selecting a spread code each time a telephone call, etc. at subordinate unit 50A is ended, whereby an excellent privacy securing property is obtained, and, due to the fact that the same parts can be used, the number of parts can be reduced. In addition, there is no need to provide a spread code series writing device or the like.

While in the above embodiments the spread code series setting, the selection and setting of the address A(M) of the ROM storing a number of spread code setting, etc. are performed when the subordinate unit is placed in a predetermined subordinate-unit holding section of the master unit, it is also possible, in the case, for example, of radio setting, to perform these setting operations when communication between the master and subordinate units has ended. In this case, it is possible to separately provide a charger for the subordinate unit.

Although the above embodiments have been described as being applied to a cordless telephone, this should not be construed restrictively. The present invention is also applicable to other types of mobile unit communication systems.

As described above, in accordance with the spread code setting method of the present invention, the requisite spread code series for communication between the stationary communication controller and the mobile terminal means by the spread spectrum communication system is generated and stored each time a predetermined condition is satisfied, and, at the same time, the mobile terminal means is supplied with information on the spread code series, the mobile terminal means setting the spread code series obtained from this information, whereby the possibility of the same spread code series being shared by a plurality of communication apparatus is markedly reduced, and, due to the fact that a spread code series is generated each time it is required, the same parts can be used, whereby the number of parts can be reduced. Further, there is no need to provide a spread code series writing device or the like at the time of shipment of communication apparatus, etc.

Further, in a spread code setting apparatus according to the present invention, when communication is to be performed between the stationary communication controller and the mobile terminal means by the spread spectrum communication system, a limited number of requisite spread code series are prepared and stored in read only storage means so as to be provided in the stationary communication controller and the mobile terminal means, wherein the stationary communication controller selects a predetermined address from addresses in the read only storage means each time a predetermined condition is satisfied to set a spread code series, and supplies the mobile terminal means with information on the setting of the spread code series so that a spread code series corresponding to the same address portion can be extracted and set in both the stationary communication controller and the mobile terminal means, whereby the possibility of this communication apparatus sharing the same spread code series with other communication apparatus is markedly reduced, and, due to the fact that a spread code series is set each time it is required, the same parts can be used, whereby the number of parts can be reduced. Further, the writing of spread code series, etc. is facilitated.

In addition, in a spread code setting method according to the present invention, a spread code series is generated and set in the stationary communication controller by a spread code series generating means when a predetermined condition is satisfied, and, at the same time, the mobile terminal means is supplied with information on the setting of the spread code series through a radio circuit, the mobile terminal means also setting the spread code series, so that spread spectrum communication is performed between the stationary communication controller and the mobile terminal means using the same spread code series. Thus, due to the fact that a spread code series is set each time it is required, the same parts can be used, whereby the number of parts can be reduced, and, further, there is no need to provide a spread code series writing device or the like at the time of the shipment of the communication equipment, etc. Moreover, a substantial improvement is achieved in terms of the privacy securing property.

Further, in a spread code setting method according to the present invention, a spread code series is generated and set in the stationary communication controller by a spread code series generating means each time a predetermined condition is satisfied, and, at the same time, the mobile terminal means is supplied with information on the setting of the spread code series through a cable circuit, the mobile terminal means setting the spread code series on the basis of this information, so that spread spectrum communication can be performed between the stationary communication controller and the mobile terminal means using the same spread code series. Thus, due to the fact that the same parts can be used, the number of parts can be reduced, and, further, there is no need to provide a spread code series writing device or the like. Moreover, a substantial improvement is achieved in terms of a privacy securing property.

Further, in a spread code setting method according to the present invention, it is detected whether the above-mentioned predetermined condition is satisfied or not by using a means for detecting the starting or ending of communication between the stationary communication controller and the mobile terminal means, or by using a current detection means for detecting the mobile terminal means when it is set in a predetermined place, so that a spread code series can be generated each time it is required, thereby markedly reducing the possibility of the same spread code series being used.

What is claimed is:

1. A spread code series setting apparatus for setting a spread code series used in a radio communication system capable of performing communication according to spread spectrum, the spread code series setting apparatus comprising:

a stationary communication unit including a first spread code series memory for storing a plurality of spread code series, an address generating element for generating an address for said first spread code series memory, and a spread code series address outputting circuit for outputting said address; and a movable unit including a second spread code series memory for storing the plurality of spread code series, a spread code series address receiving circuit for receiving said address outputted by said spread code series address outputting circuit, and a spread code series producing element for reading the received addressed from said second spread code series memory and producing a spread code series;

wherein said first and second spread code series memory have the same spread code series in the same address.

2. A spread code series setting apparatus according to claim 1, wherein said spread code series address outputting circuit outputs said address to said spread code series address receiving circuit through a connection between a terminal of said movable unit and a terminal of said stationary communication unit.

3. A spread code series setting apparatus according to claim 2, wherein the connection between the terminal of said movable unit and the terminal of said stationary communication unit is a part of a charging circuit for charging a battery of said movable unit from a power supply of said stationary communication unit.

4. A spread code series setting apparatus according to claim 1, wherein said spread code series address outputting circuit outputs said address to said spread code series address receiving circuit through a radio link.

5. A spread code series setting apparatus according to claim 1, wherein said spread code series producing element includes an arithmetic processing device which generates M spread code series by means of software using a generated polynomial.

23

6. A spread code series setting apparatus according to claim 1, wherein said address generating element generates the address based on a random number.

7. A spread code series setting apparatus according to claim 1, wherein said address generating element includes an arithmetic processing device which selects said predetermined address by generating said random number by software using generated polynomial.

8. A spread code series setting apparatus according to claim 1, wherein said address generating element includes a generating circuit which generates a random number, and wherein said generating circuit has a plurality of shift registers and an exclusive OR circuit.

9. A spread code series setting apparatus for setting a spread code series used in a radio communication system capable of performing communication according to spread spectrum, the spread code series setting apparatus comprising:

a stationary communication unit including a spread code series memory for storing the spread code series and a spread code series outputting circuit for outputting a spread code series data when detecting that a current spread code series is to be substituted for another spread code series, which is used for setting said spread code series; and a movable unit including a spread code series receiving circuit for receiving said spread code series data, a spread code series producing element for producing a spread code series on the basis of the received spread code series data, a spread code series memory for storing the obtained spread code series and a control unit for controlling said spread code series producing element and said spread code series memory;

wherein said spread code series outputting circuit and said spread code series receiving circuit perform communication through either a radio link or a connection between a terminal of said stationary communication unit and a terminal of said movable unit;

wherein said control unit compares a first spread code series data through said radio link with a second spread code series data through said connection between the terminal of said stationary communication unit and the terminal of said movable unit and demands to transmit said spread code series data again when there is a discordance between said first spread code series data and said second spread code series data; and wherein said spread code series producing element generates the spread code series when said first spread code series data is identical to said second spread code series data.

10. A spread code series setting apparatus according to claim 9, wherein said control unit compares the first spread code series data through said radio link with the second spread code series data through said connection between the terminal of said stationary communication unit and demands to transmit said spread code series data again of said stationary communication unit when there is a discordance between said first spread code series data and said second spread code series data.

11. A spread code series setting apparatus according to claim 9, wherein said spread code series memory of said stationary communication unit and said spread code series memory of said movable unit have the same spread code series in the same address and said spread code series data is an address of said spread code series memories.

12. A spread code series setting apparatus according to claim 9, wherein said stationary communication unit further comprises:

24 a detecting element for detecting that said current spread code series is to be substituted for another spread code series and generating a detection signal; and a generating element for generating said another spread code series when said detecting element has detected that said current spread code series is to be substituted for another spread code series, and wherein said spread code series memory of said stationary communication unit stores the generated spread code series, and wherein said spread code series outputting circuit outputs said generated spread code series as said spread code series data.

13. A spread code series setting apparatus according to claim 12, wherein said detecting element of said stationary communication unit generates said detection signal in the case of detecting charging current supplied through a charging terminal to batteries of said movable unit.

14. A spread code series setting apparatus according to claim 12, wherein said detecting element of said stationary communication unit generates said detection signal when beginning or finishing a communication between said stationary communication unit and said movable unit.

15. A spread code series setting apparatus according to claim 12, wherein said spread code series producing element includes a generating circuit having, in combination, a plurality of shift registers and an exclusive OR circuit.

16. A spread code series setting apparatus for setting a spread code series used in a radio communication system capable of performing communication according to spread spectrum, the spread code series setting apparatus comprising:

a stationary communication unit including a detecting element for detecting that a current spread code series is to be substituted for another spread code series and generating a detection signal, a generating element for generating said spread code series when said detecting element has detected that the current spread code series is to be substituted for another spread code series, a first memory for storing the generated spread code series, a second memory for storing a basic spread code series, a spreading element for spreading said generated spread code series by said basic spread code series, and a spread code series outputting circuit for outputting a spread code series data which is spread by said spread element and;

a movable unit including a spread code series receiving circuit for receiving said spread code series data from said spread code series outputting circuit, a spread code series producing element for producing a spread code series on the basis of the received spread code series data, a spread code series memory for storing the obtained spread code series, and a control unit for controlling said spread code series producing element and said spread code series memory.

17. A spread code series setting apparatus according to claim 16, wherein said movable unit further comprises a memory for storing the same basic spread code series that said second memory of said stationary communication unit stores, wherein said spread code series producing element despreading said received spread code series data by said same basic spread code series stored in said memory and producing said spread code series.

18. A spread code series setting method for setting spread code series to be used in a radio communication system capable of performing communication according to spread spectrum method, said setting method comprising:

a transmitting step including an address generating step for generating an address of a first spread code series memory which stores a plurality of spread code series and a spread code series address outputting step for outputting said address; and a receiving step including a spread code series address receiving step for receiving said address outputted by said spread code series address outputting step and a spread code series producing step for producing a spread code series by reading a data from a second spread code series memory which stores a plurality of spread code series on the basis of said received address, wherein said first and second spread code series memory have the same spread code series in the same address.

19. A spread code series setting method according to claim 18, wherein said generating step generates the address based on a random number, and wherein said transmitting step performs communication through a radio link.

20. A spread code series setting method according to claim 18, wherein said generating step generates the address based on a random number, and wherein said transmitting step performs communication through a connection between terminals.

21. A spread code series setting method for setting spread code series to be used in a radio communication system capable of performing communication according to spread spectrum method, said setting method comprising:

a transmitting step including a spread code series outputting step for outputting a spread code series data which is used for setting said spread code series when a current spread code series stored in a first spread code series memory is to be substituted for another spread code series; and a receiving step including a spread code series receiving step for receiving said spread code series data, a spread code series producing step for producing a spread code series on the basis of said received spread code series data, a storing step for storing the obtained spread code series in a second spread code series memory, a resending step for demanding to transmit said spread code series data again and a control step for controlling said resending step, wherein the communication is performed through both a radio link and a connection between terminals in said spread code series outputting step and said spread code series receiving step, and said control step compares a first spread code series data through said radio link with a second spread code series data through said connection between the terminals and demands to resend to said resending step when there is a discordance between said first spread code series data.

22. A spread code series setting method for setting spread code series to be used in a radio communication system capable of performing communication according to spread spectrum method, said setting method comprising:

a transmitting step including a detecting step for detecting that the current spread code series is to be substituted for another spread code series and generating a detection signal, a generating step for generating said another spread code series when said detecting step has detected that the current spread code series is to be substituted for another spread code series, a first storing step for storing the generated spread code series, a second storing step for storing a basic spread code series, a spreading step for spreading said generated spread code series by said basic spread code series and a spread code series outputting step for outputting a resultant spread code series data which is spread by said spreading step;

a receiving step including a spread code series receiving step for receiving said spread code series data, spread code series producing step for producing a spread code series on the basis of the received spread code series data and a spread code series storing step for storing the thus-obtained spread code series.

23. A spread code series setting method according to claim 22, wherein said transmitting step performs communication through a connection between terminals.

24. A spread code series setting method according to claim 22, wherein said transmitting step performs communication through a radio link.

* * * * *